(12) United States Patent
Fuller et al.

(10) Patent No.: US 12,074,653 B2
(45) Date of Patent: Aug. 27, 2024

(54) WIRELESS UNIVERSAL INTERFACE

(71) Applicant: FISHER CONTROLS INTERNATIONAL LLC, Marshalltown, IA (US)

(72) Inventors: John S. Fuller, Marshalltown, IA (US); Kenneth W. Junk, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 17/809,894

(22) Filed: Jun. 29, 2022

(65) Prior Publication Data

US 2022/0337325 A1 Oct. 20, 2022

Related U.S. Application Data

(63) Continuation of application No. 16/904,509, filed on Jun. 17, 2020, now abandoned.

(51) Int. Cl.

| | |
|---|---|
| *H04B 17/26* | (2015.01) |
| *H04L 9/30* | (2006.01) |
| *H04L 9/32* | (2006.01) |
| *H04L 9/40* | (2022.01) |
| *H04L 67/12* | (2022.01) |
| *H04W 24/10* | (2009.01) |
| *H04W 88/08* | (2009.01) |
| *H04W 88/18* | (2009.01) |

(52) U.S. Cl.
CPC ........... *H04B 17/26* (2015.01); *H04L 9/3066* (2013.01); *H04L 9/3226* (2013.01); *H04L 63/0435* (2013.01); *H04L 67/12* (2013.01); *H04W 24/10* (2013.01); *H04W 88/085* (2013.01); *H04W 88/184* (2013.01)

(58) Field of Classification Search
CPC ..... H04B 17/26; H04L 9/3066; H04L 9/3226; H04L 63/0435; H04L 67/12; H04W 24/10; H04W 88/085; H04W 88/184
See application file for complete search history.

(56) References Cited

U.S. PATENT DOCUMENTS

| | | | |
|---|---|---|---|
| 9,934,671 B1 * | 4/2018 | Anderson | G05B 23/0208 |
| 2018/0113442 A1 * | 4/2018 | Nixon | G05B 19/4184 |
| 2019/0101910 A1 * | 4/2019 | Schleiss | G05B 23/0272 |

* cited by examiner

*Primary Examiner* — Duc C Ho
(74) *Attorney, Agent, or Firm* — MARSHALL, GERSTEIN & BORUN LLP

(57) ABSTRACT

Systems and techniques for accessing and controlling field devices to collect data and convert protocols are disclosed herein. An example system to access a field device includes one or more processors, a transmitter, a wireless network interface controller, and a memory storing instructions that, when executed, may cause the field communicator device to retrieve process parameter data encoded in a field device transmission protocol. The field communicator device may retrieve the process parameter data at a plurality of time intervals from a field device, and the process parameter data may correspond to a process parameter for the field device. The field communicator device may also store at least some of the process parameter data, analyze the process parameter data over the plurality of time intervals to identify a condition of the field device, and transmit an indication of the condition of the field device to a remote device.

41 Claims, 6 Drawing Sheets

WIRELESS UNIVERSAL INTERFACE

TECHNICAL FIELD

The present disclosure generally relates to process plants and process control systems, and more particularly, to providing wireless data collection, data storage, and data protocol conversion facilities for a field device within a process plant.

BACKGROUND

Distributed process control systems, like those used in chemical, petroleum, industrial or other process plants to manufacture, refine, transform, generate, or produce physical materials or products typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process and/or environmental parameters such as temperature or pressure, etc. to control one or more processes executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system, e.g., to control at least a portion of one or more industrial processes running or executing within the plant or system. For example, the controllers and the field devices control at least a portion of a process being controlled by the process plant or system. I/O devices, which are also typically located within the plant environment, typically are disposed between a controller and one or more field devices, and enable communications there between, e.g. by converting electrical signals into digital values and vice versa. As utilized herein, field devices and controllers are generally referred to as "process control devices."

Information from the field devices and the controller is usually made available over a data highway or communication network to one or more other hardware devices, such as operator workstations, personal computers or computing devices, data historians, report generators, centralized databases, or other centralized administrative computing devices that are typically placed in control rooms or other locations away from the harsher plant environment. Generally, the data highway or communication network is a low-bandwidth wired network. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Typically, a process plant requires physical devices, connections, wiring, etc. to be installed, set up, and interconnected in the field environment of the process plant via physical wiring. At the back-end environment of the plant (e.g., at the centralized administrative computing devices such as operator workstations, personal computers or computing devices, centralized databases, configuration tools, etc. that are typically placed in control rooms or other locations away from the harsher field environment of the plant), data that specifically identifies and/or addresses the various devices, their configurations, and their interconnections is integrated, verified or commissioned, and stored. As such, after the physical hardware has been installed and configured, identification information, logical instructions, and other instructions and/or data is downloaded or otherwise provided to the various devices disposed in the field environment so that the various devices are able to communicate with other devices via wired connections.

Typically, field devices are accessed by different categories of users. For example, control engineers may program field devices using workstations located in the back-end environment of the plant. Operations users may monitor field devices for operational statuses, trends (e.g., value thresholds), control loop performance, etc. Maintenance users may also access various devices in a process plant to repair, reconfigure, replace and/or maintain the devices on a routine and/or emergency basis. Each of the users may access the field devices through connections to the field devices which may be direct connections facilitated by a handheld or portable communicator device or via installed process plant networks. Field devices may produce a large volume of data that saturates the hard-wired network in a process plant and communicating directly with handheld devices can be tedious and time consuming as it generally requires a temporary direct hardwired connection to the field device. In addition, data from field devices that is received via an installed hard-wired network of the process plant will be delayed due to the need to traverse a series of hops within the hard-wired network. Moreover, because diagnostic data from field devices may not be associated with the primary purpose of the field device within the process plant, this data may be deprioritized with respect to data concerning the plant's primary functions. Such deprioritized data may cause significant delays in troubleshooting, upgrading, and maintaining field devices.

Moreover, some activities (e.g., diagnosing a field device) may require a user (e.g., a maintenance user) to physically access the field device, resulting in an array of complications. First, the user may need to remove a cover of the field device to access the communication terminals of the field device and, during this process the internals of the field device may be exposed to a potentially hazardous plant environment (e.g., combustible gases, toxins, exhaust, heat, sparks, arc flash, etc.). Accessing the field device may require the user to remove and/or replace a housing of the field device, potentially exposing the field device to contamination and/or voiding a certification of the field device (e.g., Hazardous Area Certification) and mandating that the user replace various disposable hardware components as a result of accessing a field device (e.g., a rubber gasket, an O-ring, etc.). As a result, the field engineer may occasionally carry extra replacement hardware to the field device, increasing the physical burden on the field engineer/user. Moreover, accessing the field device typically requires special permitting that may take time to acquire, and that may not be granted in every circumstance.

SUMMARY

The systems and methods of the present disclosure allow a field engineer to quickly, easily, and wirelessly communicate with field devices. Using the present techniques, a field engineer may obtain current process data, retrieve historian data in response to alerts, download firmware updates, and the like without ever physically accessing the field device. Accordingly, the present techniques allow field engineers to perform many routine tasks associated with field device operation/maintenance without exposing the internals of the field device to a potentially hazardous plant environment, thereby increasing the efficiency of the field engineers and prolonging the working lifespan of the field devices.

A field communicator device in accordance with the present techniques may comprise one or more processors, a transmitter, a wireless network interface controller, and a memory. The memory may store instructions that, when executed by the one or more processors, cause the field communicator device to retrieve, at a plurality of time intervals from a field device communicatively coupled to the field communicator device via the transmitter, process parameter data encoded in a field device transmission protocol, the process parameter data corresponding to a process parameter for the field device; store, in the memory, at least some of the process parameter data; analyze the process parameter data over the plurality of time intervals to identify a condition of the field device; and transmit, via the wireless network interface controller, an indication of the condition of the field device to a remote device.

A method in accordance with the present techniques may identify a condition of a field device in a process plant. The method may comprise retrieving, by one or more processors in a field communicator device at a plurality of time intervals from a field device communicatively coupled to the field communicator device via a transmitter, process parameter data encoded in a field device transmission protocol. The process parameter data may correspond to a process parameter for the field device, and the field communicator device may include a transmitter for communicating with the field device via a first communication link and a wireless network interface controller for communicating with remote devices via a second communication link. The method may further include storing, by the one or more processors in the memory, at least some of the process parameter data; analyzing, by the one or more processors, the process parameter data over the plurality of time intervals to identify a condition of the field device; and transmitting, by the one or more processors via the wireless network interface controller, an indication of the condition of the field device to a remote device.

Another field communicator device in accordance with the present techniques may comprise one or more processors, a transmitter, a wireless network interface controller, and a memory. The memory may store instructions that, when executed by the one or more processors, cause the field communicator device to detect a triggering event; in response to detecting the trigging event: retrieve, from a field device communicatively coupled to the field communicator device via the transmitter, process parameter data associated with the field device; store the process parameter data in the memory along with an indication of a time in which the process parameter data was retrieved; and transmit, via the wireless network interface controller, the process parameter data to a remote device; and remove the process parameter data from the memory after a threshold duration or in response to receiving an indication from the remote device that the process parameter data was received.

Still another field communicator device in accordance with the present techniques may comprise one or more processors, a transmitter, a wireless network interface controller, and a memory. The memory may store instructions that, when executed by the one or more processors, cause the field communicator device to obtain, via the wireless network interface controller, a firmware image for updated firmware for a field device communicatively coupled to the field communicator device; verify a provider of the firmware image; and in response to verifying the provider of the firmware image, download, via the transmitter, the firmware image to the field device.

A method in accordance with the present techniques may update a firmware image in a field device in a process plant. The method may comprise obtaining, by one or more processors in a field communicator device via a wireless network interface controller, a firmware image for updated firmware for a field device communicatively coupled to the field communicator device. The field communicator device may include a transmitter for communicating with the field device via a first communication link and the wireless network interface controller for communicating with remote devices via a second communication link. The method may further include verifying, by the one or more processors, a provider of the firmware image; and in response to verifying the provider of the firmware image, downloading, by the one or more processors via the transmitter, the firmware image to the field device.

DETAILED DESCRIPTION

Figure 1:
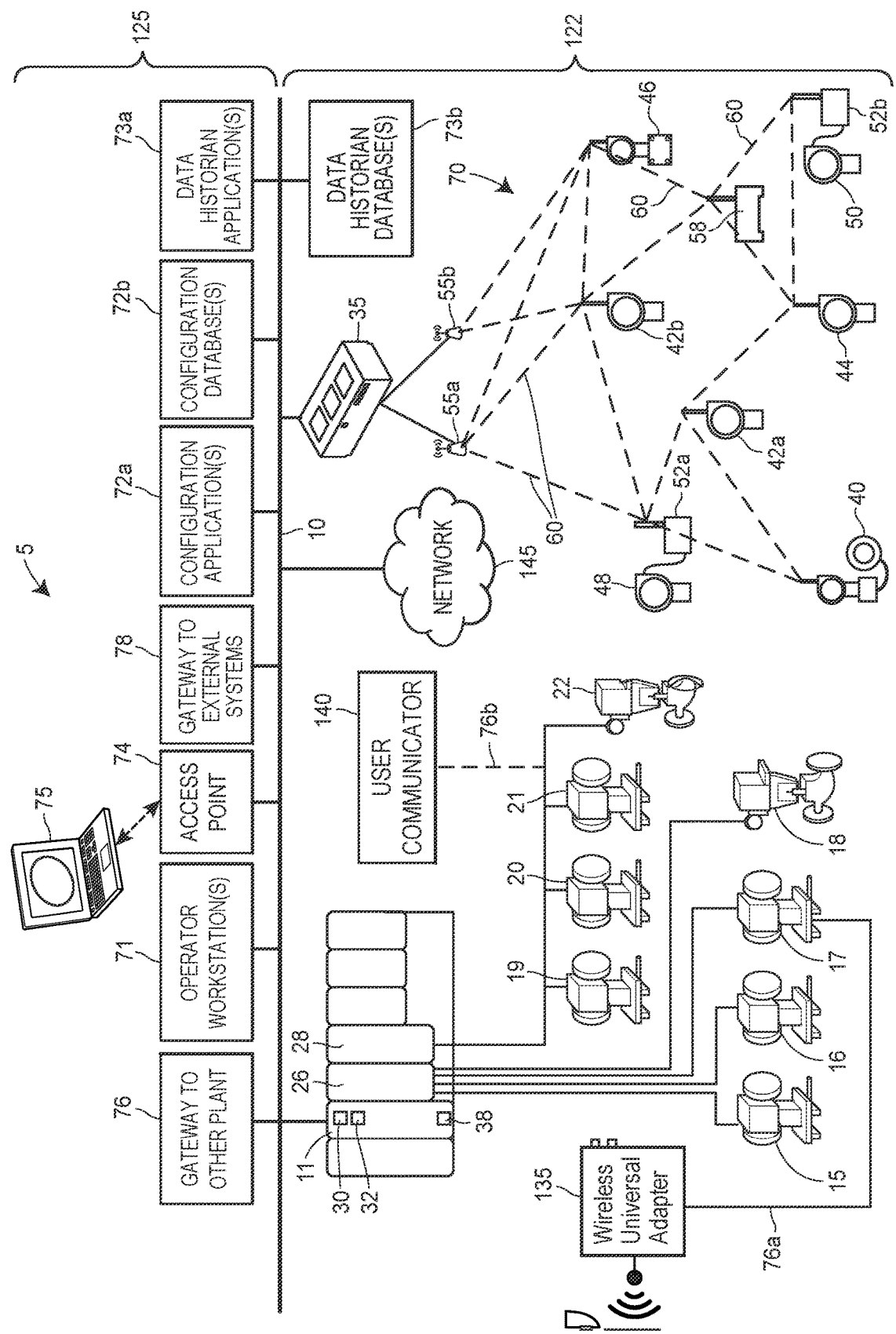
FIG. 1 depicts a block diagram illustrating an example process plant and components thereof, at least a portion of which may include the data collection, data storage, and protocol conversion techniques described herein.

Process plants generally include a plurality of devices of different types, which monitor various aspects of processes within the process plant, to ensure that the systems and components of the plants are designed, tested, installed, operated, and maintained according to the operational requirements of the owners or clients, thus guaranteeing the operability, performance, reliability, safety, and information traceability of the process plants.

The devices of different types may include field devices such as HART®, WirelessHART®, and FOUNDATION® Fieldbus field devices. Each of the field devices may be hard-wired into a computer network that is communicatively coupled to a variety of back-end services (e.g., a management system, a workstation, a database, etc.), permitting users (e.g., employees of the process plant) to monitor, configure, access, and deploy the field devices. In certain aspects, field devices may be accessed via one or more controllers. Generally, a "process control device," "control device," or "field device" may be any device within the plant environment, including control devices, safety devices, monitoring devices, and/or the like, that may be configured to initiate, implement, and/or manage functionalities associated therewith.

A process plant may include a field device coupled to a field communicator device (also referenced herein as a "wireless universal adapter," or "WUA"), wherein the field communicator is wirelessly accessible via a user communicator. Generally, a user may access the field communicator using the user communicator, to orchestrate the reading of data from, and the writing of data to, the field device. For example, the user may use the user communicator to issue a command. The command may be transmitted from the user communicator to the field communicator in a general-purpose computing communication protocol (e.g., Hyper Text Transfer Protocol). The field communicator may receive the command, convert the command to a process control protocol command, and transmit the converted command to the field device. The field communicator may read a response of the command, and transmit the response to the user communicator. In general, any suitable form of transitive bidirectional communication may be implemented between the field device, the field communicator, and the user communicator.

The field communicator may facilitate certain capabilities of the field device that are otherwise lacking in the field device (e.g., data collection, data caching, data conversion routines, wireless transmission capabilities, etc.). The field communicator may be installed in conjunction with the field device by the manufacturer of the field communicator (e.g., at the time of the fabrication of the field device) or by the purchaser/user of the field device. For example, a process plant operator may acquire a field device and a field communicator, together or separately, and the plant operator may install the field communicator into the field device before deploying the field device into the process plant. A user communicator may be provided with the field communicator or separately. Alternately, or in addition, the plant operator may obtain a field communicator and install the field communicator into an existing deployed field device (i.e., retrofit/upgrade an existing field device).

The field device may be linked to the field communicator (e.g., by a wired or wireless connection) and the field communicator may read data from the field encoded in a process control protocol. The field communicator may convert that process control protocol-encoded data into a general purpose computing communication protocol. The field communicator may cache the original and/or converted data in short- or long-term memory. The field communicator may transmit the converted data to another device in the process plant (e.g., a router, a repeater, a device within a wireless mesh network, etc.) via a wireless network interface controller of the field communicator.

Typically, process control protocol data from field devices is only available within a process plant via a low bandwidth wired environment. However, because the field communicator may be directly linked to the field device via a wireless connection, the field communicator may retrieve data from the field device at high bandwidth/throughput rates (e.g., 1 gigabyte per second or more) and may retrieve large volumes of data from the field device relatively quickly, as compared to the traditional low bandwidth access to field device data. Furthermore, because the field communicator may include a wireless network interface card linked to a high-speed wireless network, the field communicator may facilitate real-time high-speed access to field devices by any other devices in the process plant that have traditionally lacked such access. For example, the field communicator may wirelessly exchange data with other field communicators, with stationary components within the process plant, and/or with mobile components (e.g., a user communicator) within or proximate to the process plant.

The field communicator may standardize access to field devices having disparate process control protocols (e.g., via an Application Programming Interface (API)). For example, a given field device may emit data in a packet-based format, a packed binary format, etc. The format may be proprietary to a field device manufacturer, and may not be backwards-compatible between devices. The field communicator may include a library of protocol conversion routines that allow the field communicator to facilitate transparent and standardized access to field devices having disparate process control protocols. For example, a field communicator could be installed in three respective field devices manufactured by different manufacturers, which emit data in three different respective process control protocols. Furthermore, each of the three field devices may include three respective sets of functionality, wherein there is some overlap. For example, each of the three devices may support a version command, which when executed, returns the software version of the respective field device. However, the commands that must be issued to the respective devices to obtain the version may be distinct.

In the above example, a user may access the field communicator using the user communicator via the API of the field communicator. For example, the user may issue, e.g., a GetVersion command. One or more field devices may be provided as parameters to the GetVersion command. Software instructions executing in the field communicator may determine an appropriate system call, based on the identity/type of the field device provided as a parameter. In the above example, the field communicator may issue three different version commands to each of the respective field devices. One benefit of this unified interface to disparate field devices is that the user's programming task is simplified. The user only must write one query, instead of three. The library of protocol conversion routines is a helpful black box abstraction. A further benefit of the field communicator API is that multiple field devices may be queried in parallel, via multi-threaded and/or multiprocessor code. Further benefits are envisioned.

For example, regardless of how a particular field device becomes equipped with field communicator capabilities, a field device so equipped gains a number of important and beneficial uses in the context of the process plant, including without limitation, the ability of the plant operator to remotely administer the field device, the ability to segregate data from one or more field device into separate networks (e.g., for security and/or load management purposes) and the elimination of the mandate of direct physical access to field devices once deployed. Accordingly, an administrator of a process plant may efficiently and effectively administer field devices without exposing the administrator or the field device to potentially hazardous conditions. Large volumes of data may be read from and written to the memory of the field device in real-time, or near real-time, without disrupting the network priority of other data transmitted within the process plant. The systems and methods may allow field devices to be more efficiently provisioned/commissioned, and may allow data to be cached in the memory of the field communicator, allowing certain attributes of the field device (e.g., software version, last calibration date, etc.) to be more quickly retrieved.

The systems and methods may further enable the administrator to initiate corrective action and/or other functionalities related to collecting data from field devices, and transforming data to and from certain protocols. For example, a user may be in the field environment of a process plant, and may notice via visual inspection that a valve appears to be stuck. Historically, the user would need to physically access the field device associated with the valve, and the user may first need to retrieve a process control protocol-specific piece of hardware to perform a diagnostic. Even if the user had the correct hardware, the user may need to refer to documentation of an unfamiliar process control protocol, which may be very time-consuming. However, using the present techniques, the user may use the user communicator to access the field device immediately, whereupon the user may access the cache of the field device to determine the current state of the valve (e.g., using a GetValveState command), as well as a snapshot of historical valve states. This data may be presented to the user via a graphical user interface, allowing the user to quickly intuit that the state of the valve has been stuck in a particular position for a long time.

In the above example, a user accesses the field communicator via a user communicator. However, in the context of the invention, the field communicator may be configured to automatically (e.g., periodically) execute commands, retrieve data from the field device, transmit data to the network, etc. without the explicit intervention of a user. Also, multiple users may access the field communicator simultaneously, using one or more general-purpose computing communication protocol. For example, a first user may access the field communicator via a hand-held user communicator via Bluetooth® Low-Energy (BLE), while a second user accesses the field communicator via an HTTP connection from a high-performance computing device.

Exemplary Wireless Universal Adapter Systems

FIG. 1 is a block diagram of an example process plant, process control system, or process control environment 5 in which one or more field communicators as described herein may be installed and operate. The process control environment 5 includes one or more process controllers that may receive signals indicative of process measurements made by field devices, process this information to implement a control routine, and generate control signals that are sent over wired or wireless process control communication links or networks to other field devices to control the operation of a process in the plant 5. Typically, at least one field device performs a physical function (e.g., opening or closing a valve, increasing or decreasing a temperature, etc.) to control the operation of a process, and some types of field devices communicate with controllers by using I/O devices. Process controllers, field devices, and I/O devices may be wired or wireless, and any number and combination of wired and wireless process controllers, field devices and I/O devices may be included in the process plant environment or system 5.

For example, FIG. 1 illustrates a process controller 11 that is communicatively connected to wired field devices 15-22 via input/output (I/O) cards 26 and 28, and that is communicatively connected to wireless field devices 40-46 via a wireless gateway 35 and a process control data highway or backbone 10 (which may include one or more wired and/or wireless communication links, and may be implemented using any desired or suitable or communication protocol such as, for example, an Ethernet protocol). In an embodiment, the controller 11 is communicatively connected to the wireless gateway 35 using one or more communications networks other than the backbone 10, such as by using any number of other wired or wireless communication links that support one or more general-purpose computing communication protocols (e.g., Wi-Fi or other IEEE 802.11 compliant wireless local area network protocol, a mobile communication protocol (e.g., WiMAX, LTE, or other ITU-R compatible protocol), Bluetooth®, etc.) or a process control protocol (e.g., HART®, WirelessHART®, Profibus, FOUNDATION® Fieldbus, etc.).

The controller 11, which may be, by way of example, the DeltaV™ controller sold by Emerson Process Management, may operate to implement a batch process or a continuous process using at least some of the field devices 15-22 and 40-46. In addition to being communicatively connected to the process control data highway 10, the controller 11 may also be communicatively connected to at least some of the field devices 15-22 and 40-46 using any desired hardware and software associated with, for example, standard 4-20 mA devices, I/O cards 26, 28, and/or any smart communication protocol such as the FOUNDATION® Fieldbus protocol, the HART® protocol, the WirelessHART® protocol, etc. In FIG. 1, the controller 11, the field devices 15-22 and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols, including any standards or protocols developed in the future.

The process controller 11 of FIG. 1 includes a processor 30 that implements or oversees one or more process control routines 38 (e.g., that are stored in a memory 32). The processor 30 is configured to communicate with the field devices 15-22 and 40-46 and with other process control devices communicatively connected to the controller 11. It should be noted that any control routines or modules described herein may have parts thereof implemented or executed by different controllers or other devices if so desired. Likewise, the control routines or modules 38 described herein which are to be implemented within the process control system 5 may take any form, including software, firmware, hardware, etc. Control routines may be implemented in any desired software format, such as using object oriented programming, ladder logic, sequential function charts, function block diagrams, or using any other software programming language or design paradigm. The control routines 38 may be stored in any desired type of memory 32, such as random access memory (RAM), or read only memory (ROM). Likewise, the control routines 38 may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

In some embodiments, the controller 11 implements a control strategy using what are commonly referred to as function blocks, where each function block is an object or other part (e.g., a subroutine) of an overall control routine and operates in conjunction with other function blocks (via communications called links) to implement process control loops within the process control system 5. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 5. Of course, hybrid and other types of function blocks exist. Function blocks may be stored in and executed by the controller 11, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. The controller 11 may include one or more control routines 38 that may implement one or more control loops, and may be performed by executing one or more of the function blocks.

The wired field devices 15-22 may be any types of devices, such as sensors, valves, transmitters, positioners, etc., while the I/O cards 26 and 28 may be any types of I/O devices conforming to any desired communication or controller protocol. In FIG. 1, the field devices 15-18 are standard 4-20 mA smart devices or HART® devices that communicate over analog lines or combined analog and digital lines to the I/O card 26, while the field devices 19-22 are smart devices, such as FOUNDATION® Fieldbus field devices, that communicate over a digital bus to the I/O card 28 using a FOUNDATION® Fieldbus communications protocol. In some embodiments, though, at least some of the wired field devices 15-22 and/or at least some of the I/O cards 26, 28 additionally or alternatively communicate with the controller 11 using the process control data highway 10 and/or by using other suitable control system protocols (e.g., Profibus, DeviceNet, Foundation Fieldbus, ControlNet, Modbus, HART, etc.).

In FIG. 1, the wireless field devices 40-46 communicate via a wireless process control communication network 70 using a wireless protocol, such as the WirelessHART® protocol. Such wireless field devices 40-46 may directly communicate with one or more other devices or nodes of the wireless network 70 that are also configured to communicate wirelessly (using the wireless protocol or another wireless protocol, for example). To communicate with one or more other nodes that are not configured to communicate wirelessly, the wireless field devices 40-46 may utilize a wireless gateway 35 connected to the process control data highway 10 or to another process control communications network. The wireless gateway 35 provides access to various wireless devices 40-58 of the wireless communications network 70. In particular, the wireless gateway 35 provides communicative coupling between the wireless devices 40-58, the wired devices 11-28, and/or other nodes or devices of the process control plant 5. For example, the wireless gateway 35 may provide communicative coupling by using the process control data highway 10 and/or by using one or more other communications networks of the process plant 5.

Similar to the wired field devices 15-22, the wireless field devices 40-46 of the wireless network 70 perform physical control functions within the process plant 5, e.g., opening or closing valves, or taking measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some configurations of the process plant 5, the wireless network 70 includes non-wireless devices. For example, in FIG. 1, a field device 48 of FIG. 1 is a legacy 4-20 mA device and a field device 50 is a wired HART® device. To communicate within the network 70, the field devices 48 and 50 are connected to the wireless communications network 70 via a wireless adaptor 52*a*, 52*b*. The wireless adaptors 52*a*, 52*b* support a wireless protocol, such as WirelessHART, and may also support one or more other communication protocols such as Foundation® Fieldbus, PROFIBUS, DeviceNet, etc. Additionally, in some configurations, the wireless network 70 includes one or more network access points 55*a*, 55*b*, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communications network 70. In FIG. 1, the wireless devices 40-46 and 52-58 communicate with each other and with the wireless gateway 35 over wireless links 60 of the wireless communications network 70, and/or via the process control data highway 10.

In FIG. 1, the process control system 5 includes one or more operator workstations 71 that are communicatively connected to the data highway. Via the operator workstations 71, operators may view and monitor real-time operations of the process plant 5, as well as take any diagnostic, corrective, maintenance, and/or other actions that may be required. At least some of the operator workstations 71 may be located at various, protected areas in or near the plant 5, and in some situations, at least some of the operator workstations 71 may be remotely located, but nonetheless in communicative connection with the plant 5. Operator workstations 71 may be wired or wireless computing devices.

The process control system 5 includes an asset management system 68 configured to facilitate certain of the functionalities discussed herein. The asset management system 68 may interface and communicate with a portion or all of the field devices 15-22 and 40-46, such as via the process controller 11 and/or the wireless gateway 35. According to embodiments, the asset management system 68 may request and retrieve, from the field devices 15-22 and 40-46, data associated with the field devices 15-22 and 40-46.

The asset management system 68 may generally include one or more software applications executing on one or more workstations (such as the operator workstation(s) 71) to enable a user to review data associated with the field devices 15-22 and 40-46 of the process control system 5. Such interaction may include diagnostics, maintenance, configuration, assessment, and/or the like. While the workstation(s) may have one or more asset management system applications running locally, a user may interface with the asset management system 68 remotely via a data communication network. Thus, a user located at the workstation(s) may interact with the asset management system 68 in order to facilitate various functions related to the process control system 5 regardless of the physical location of the user.

The example process control system 5 is further illustrated as including a configuration application 72*a* and configuration database 72*b*, each of which is also communicatively connected to the data highway 10. Various instances of the configuration application 72*a* may execute on one or more computing devices (not shown) to enable users to create or change process control modules and download these modules via the data highway 10 to the controllers 11, as well as enable users to create or change operator interfaces via which an operator is able to view data and change data settings within process control routines. The configuration database 72*b* stores the created (e.g., configured) modules and/or operator interfaces. Additionally, the configuration database 72*b* stores a set of defined or baseline parameters associated with any of the field devices 15-22, 40-46. Generally, the configuration application 72*a* and configuration database 72*b* are centralized and have a unitary logical appearance to the process control system 5, although multiple instances of the configuration application 72*a* may execute simultaneously within the process control system 5, and the configuration database 72*b* may be implemented across multiple physical data storage devices. Accordingly, the configuration application 72*a*, configuration database 72*b*, and user interfaces thereto (not shown) comprise a configuration or development system 72 for control and/or display modules. Typically, but not necessarily, the user interfaces for the configuration system 72 are different than the operator workstations 71, as the user interfaces for the configuration system 72 are utilized by configuration and development engineers irrespective of whether or not the plant 5 is operating in real-time, whereas the operator workstations 71 are utilized by operators during real-time operations of the process plant 5.

The example process control system 5 includes a data historian application 73*a* and data historian database 73*b*, each of which is also communicatively connected to the data highway 10. The data historian application 73*a* operates to collect some or all of the data provided across the data highway 10, and to historize or store the data in the historian database 73*b* for long term storage. Similar to the configuration application 72*a* and configuration database 72*b*, the data historian application 73*a* and historian database 73*b* are centralized and have a unitary logical appearance to the process control system 5, although multiple instances of a data historian application 73*a* may execute simultaneously within the process control system 5, and the data historian 73*b* may be implemented across multiple physical data storage devices.

In some configurations, the process control system 5 includes one or more other wireless access points 74 that communicate with other devices using other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as NFC and Bluetooth®, or other wireless communication protocols. Typically, such wireless access points 74 allow handheld or other portable computing devices (e.g., user interface devices 75) to communicate over a respective wireless process control communication network that is different from the wireless network 70 and that supports a different wireless protocol than the wireless network 70. For example, a wireless or portable user interface device 75 may be a mobile workstation or diagnostic test equipment that is utilized by an operator within the process plant 5 (e.g., an instance of one of the operator workstations 71). In some scenarios, in addition to portable computing devices, one or more process control devices (e.g., controller 11, field devices 15-22, I/O devices 26, 28, or wireless devices 35, 40-58) also communicate using the wireless protocol supported by the access points 74.

Further, it is noted that the process plant or control system 5 of FIG. 1 includes a field environment 122 (e.g., "the process plant floor 122") and a back-end environment 125 which are communicatively connected by the data highway 10. As shown in FIG. 1, the field environment 122 includes physical components (e.g., process control devices, networks, network elements, etc.) that are disposed, installed, and interconnected therein to operate to control the process during run-time. For example, the controller 11, the I/O cards 26, 28, the field devices 15-22, and other devices and network components 40-46, 35, 52, 55, 58 and 70 are located, disposed, or otherwise included in the field environment 122 of the process plant 5. Generally speaking, in the field environment 122 of the process plant 5, raw materials are received and processed using the physical components disposed therein to generate one or more products.

The back-end environment 125 of the process plant 5 includes various components such as computing devices, operator workstations, databases or databanks, etc. that are shielded and/or protected from the harsh conditions and materials of the field environment 122. Referring to FIG. 1, the back-end environment 125 includes, for example, the operator workstations 71, the configuration or development systems 72 for control modules and other executable modules, data historian systems 73, and/or other centralized administrative systems, computing devices, and/or functionality that support the run-time operations of the process plant 5. In some configurations, various computing devices, databases, and other components and equipment included in the back-end environment 125 of the process plant 5 may be physically located at different physical locations, some of which may be local to the process plant 5, and some of which may be remote. As discussed above, the present techniques are intended to improve the frequency and data collection ability on field devices, applying to all process, energy, and discrete industries. Whereas human operators/employees of the process plant 5 have historically needed to enter the harsh, unshielded environment of the field environment 122 for data collection purposes, the present techniques improve the speed and access of data transmission from field devices to asset management systems (e.g., asset management system 68).

As discussed herein, the configuration database(s) 72*b* may be disposed in the back-end environment 125 of the process plant 5, and may be used for data collection purposes. The configuration database(s) 72*b* may store, inter alia, data and other information that specifically identifies and/or addresses the various devices or components and their interconnections that are planned for or desired to be implemented on the process plant floor or field environment 122. Some of this data may be provided to components in the field environment 122 for use in configuration, monitoring, and/or diagnostics of devices and loops therein, and some of this data may be utilized in the back-end environment 125, e.g., for the design, development, and preparation of control modules and/or operator interface modules that will operate in conjunction with the field environment 122 during live operations of the process plant 5.

The example process control system 5 may also include one or more wireless universal adapters 135 coupled to one or more user communicators 140 by a network 145. Users of the process plant are interested in obtaining data produced by field devices, and in controlling the field devices remotely. In a preferred embodiment, the wireless universal adapter 135, the user communicator 140, and the network 145 are used in concert to facilitate such access. Generally, the wireless universal adapter 135 mediates bidirectional electronic communication between field devices and other components of the process plant. Generally, the wireless universal adapter 135 functions as a receiver of data, protocol converter, and/or transmitter of data, to enable users to perform various functions related to the access, configuration, and control of field devices.

The wireless universal adapter 135 may be a loop- and/or field-powered hardware extension that is coupled to a device (e.g., any field device such as a transmitter, control valve, etc.) via a communication channel 76*a*. The communication channel 76*a* may generally be physical wiring between the wireless universal adapter 135 and the device or a wireless connection. For example, the communication channel 76*a* may couple the wireless universal adapter 135 and the field device 17 by a 2-wire, 3-wire, or 4-wire transmitter. On the other hand, the wireless universal adapter 135 may be battery powered or have an independent power source.

The wireless universal adapter 135 may be installed on existing or new intelligent field devices. A field device may be retrofitted/upgraded to include the wireless universal adapter 135 by removing an existing cover of a legacy field device to expose a conduit/channel through which the wire transmitter may be passed to join, by wire, terminals of the field device to terminals of the wireless universal adapter 135. The wiring of field devices to the wireless universal adapter 135 is discussed in more detail below. It should be appreciated that once the wireless universal adapter 135 is installed in or on the field device, field device data may be retrieved from the field device without opening the cap or cover of the field device.

The wireless universal adapter 135 may obtain (i.e., receive and/or retrieve) encoded data from field devices via a wired or wireless connection. For example, and without limitation, the wireless universal adapter 135 may obtain data encoded in the HART protocol, the Foundation Fieldbus protocol, the Profibus protocol, and/or the Modbus protocol, as examples, from process control devices (e.g., field devices). The wireless universal adapter 135 may include a library of executable instructions, code, functions, routines, etc. which enable the wireless universal adapter 135 to obtain the data from various field devices.

In addition to obtaining encoded data from field devices, the wireless universal adapter 135 may perform protocol conversion of encoded data obtained from field devices. The data may be encoded in a process control data protocol. Specifically, the wireless universal adapter 135 may translate from a process control data protocol (e.g., HART) to a general purpose computing communication format (e.g., XML, JavaScript Object Notation, etc.), and vice versa, using a library of device-specific protocol conversion routines.

In addition to obtaining encoded data and performing protocol conversion, the wireless universal adapter 135 may transmit (i.e., send and receive) data via a general-purpose computing communication protocol. For example, the wireless universal adapter 135 may send the data formatted in a general-purpose computing communication format to another host on the network 145 (e.g., the user communicator 140) via Bluetooth®-Low-Energy. Of course, it will be appreciated that the wireless universal adapter 135 may be configured to transmit data to another host on the network 145 via any suitable communication protocol such as WiFi (e.g., IEEE 802.11), Bluetooth®, Long Range (LoRa), and/or a cellular mobile communications protocol (e.g., 4G, 5G, etc.). The wireless universal adapter 135 may also receive data formatted in a general-purpose computing communication format via a general-purpose computing communication protocol from another host on the network 145, such as the user communicator 140. The wireless universal adapter 135 may include one or more API to facilitate programmatic transmission of data formatted in a general-purpose computing communication format via the user communicator 140.

In embodiments, the wireless universal adapter 135 may also perform analytics with any data collected from the field devices. For example, the wireless universal adapter 135 may acquire, store and analyze device variable data (also referred to herein as "process parameter data") independent of the instrument to which it is connected (e.g., field devices). More specifically, the wireless universal adapter 135 may poll the instrument via its native protocol (e.g., HART) to collect, store and analyze variable data from the device. The wireless universal adapter 135 may also acquire variable data from other field devices or sensors via the general-purpose computing communication protocol, such as Bluetooth®-Low-Energy. This analysis may include a variety of analytics and/or diagnostics including, but not limited to, FIELDVUE™ diagnostics, time series analysis, and acquiring variable information from surrounding devices/sensors (e.g., field devices) to time correlate the external device data with the device associated with the wireless universal adapter 135.

Moreover, the wireless universal adapter 135 may also perform data storage in a similar fashion to the data historian 73. The wireless universal adapter 135 may acquire and store device variable data independent of the field device, such that no particular device identifier may be required. The wireless universal adapter 135 may poll the field device via its native protocol (e.g., HART) to collect and store variable data from the field device, and the wireless universal adapter 135 may acquire the variable data for a pre-determined frequency and time. The wireless universal adapter 135 may also acquire variable information from surrounding instruments via BLE and store it with the device variable data. The external variable data may then be time correlated with the device variable data for improved troubleshooting/analysis.

Further, the wireless universal adapter 135 may have a trigger to define when variable data would be stored to maximize memory. The trigger could be based on an alert, variable, etc. Namely, the wireless universal adapter 135 may trigger data collection based upon alerts associated with the corresponding field device, such that the wireless universal adapter 135 generates an alert record associated with the corresponding field device. The wireless universal adapter 135 may poll the field device in its native protocol (e.g., HART) to determine if there is an alert. If the wireless universal adapter 135 determines the presence of an alert, the wireless universal adapter 135 may poll the field device for alert information, record the alert information, and generate a timestamp associated with the alert information to be saved in memory along with the alert information. Because the alert information is in its native protocol, the wireless universal adapter 135 may not record any or a minimal amount of device-specific or identifying information related to the field device. Thus, the alert record may save processing time associated with retrieving and/or revising device identification (e.g., HART DD's) information and memory capacity requirements associated with storing the device identification information. Of course, it will be appreciated that device identification information may be stored along with the alerts stored in the alert record if memory capacity is sufficient. Accordingly, a remote system (e.g., user communicator 140) may read the native alert from the alert record stored in the wireless universal adapter 135 to present the alert to any necessary systems.

The wireless universal adapter 135 may also provide an additional security layer to data access associated with a field device. Generally speaking, security pertains to protecting changes to the configuration of the field device, preventing undesirable moving of the field device (e.g., opening/closing of a valve), and/or simulating a process variable which may affect the process. The security for conventional field devices relies on proximity and procedures, such as physical access to the field device and the procedures implemented by the plant. While some field devices have forms of security, such as configuration write lock, etc., these forms of security may be defeated by being physically present at the device. The wireless universal adapter 135 may eliminate these security flaws by polling the field device in its native communication protocol to perform many normal field device functions (e.g., configuration, calibration, etc.). For example, the additional security layer provided by the wireless universal adapter 135 may assist field technicians when performing firmware updates associated with the field devices. Where conventional systems may occupy forty minutes or more of a technician's time to perform a firmware update, the techniques described herein with respect to the wireless universal adapter 135 may allow a field technician to securely download and transfer firmware images to the main processing unit of the wireless universal adapter 135 within seconds.

A user may use the user communicator 140 to access and/or control a field device. The user communicator 140, which may include any suitable computing device, such as a desktop computer, laptop computer, a tablet or handheld smart device, a wearable computing device, etc., may include computer-executable instructions for performing a set of functions with respect to the wireless universal adapter 135. Those functions include transmitting (e.g., send and receive) information to and from the wireless universal adapter 135 via the network 145. The user communicator 140 may connect to a field device to relay field device data to the asset management system 68 via a computer network, such as a wired network or the network 145. For example, the user communicator 140 may connect to the field device 21 via a wireless communication channel 76b to retrieve field device data from the field device 21 for transmission to the asset management system 68. The user communicator 140 may include a set of client API bindings for issuing calls to the one or more API of the wireless universal adapter 135 via the network 145.

The network 145 may be an IEEE 802.11 compliant wireless local area network, ad-hoc network, mesh network, a personal area network, mobile telecommunications network such as a 3G or 4G network; a wireless local area network (WLAN), satellite communication network, terrestrial microwave network, or any other suitable wireless network. The network 145 may communicatively couple the wireless universal adapter 135 and the user communicator 140. The network 145 may provide a communication link between the wireless universal adapter 135 and other aspects of the field environment 122, such as the operator workstation 71. In some cases, access of the wireless universal adapter 135 to aspects of the back-end environment 125 may be mediated by the wireless gateway 35.

In operation, a process plant user may desire to access a field device for the purpose of obtaining information or controlling the field device. For example, a user may seek to know the status of a sensor associated with the field device (e.g., a valve), or the user may seek to change the state of valve (e.g., open or close the valve). The user may access a display or user interface of the user communicator 140. The user communicator 140 may cause a command encoded in a general-purpose computing communication format (e.g., XML) to be sent to the wireless universal adapter 135 via a general-purpose computing communication protocol (e.g., HTTPS), including an indication of the user's desire (e.g., GetValveStatus), and one or more parameters. The user communicator 140 may use client API bindings to send the command and parameters (collectively, API call), and the API of the wireless universal adapter 135 may receive the API call.

The wireless universal adapter 135 may translate the API call from the user communicator 140 using the library of protocol conversion routines into a field device command encoded in a process control protocol. Which particular process control protocol is used may depend on an indication included in the API call (e.g., a list of field device names/identifiers). In cases where only one type of field device is connected to the wireless universal adapter 135, the type of process control protocol may be selected automatically by the wireless universal adapter 135. Alternately, the wireless universal adapter 135 may query field devices to determine their types, and select a suitable protocol based on the types.

Once the wireless universal adapter 135 has translated the API call into the field device command, the wireless universal adapter 135 may issue the field device command to one or more field devices. The wireless universal adapter 135 may then synchronously and/or asynchronously read a response from the one or more field devices. In some cases, the client API bindings may include a flag or different function calls for performing synchronous and/or asynchronous operations. Next, the wireless universal adapter 135 may convert the response from the field device relating to the field device command into a general purpose computing communication format, and transmit the response back to the user communicator 140 via the network 145, whereupon the response may be processed further, displayed to the user, etc.

It should be appreciated that users may seek many different types of access to and control over field devices, and that many operations are supported by the API of the wireless universal adapter 135 and the client API bindings of the user communicator 140. For example, a user located at the operator workstation 71 may use the user communicator 140 to modify the configuration of the wired field device 17 without leaving his desk. A user may configure a device to programmatically access the wireless universal adapter 135. For example, a user communicator 140 or another device (e.g., a server device) may be programmed to automatically retrieve data from one or more field devices via the wireless universal adapter 135 on a predetermined schedule (e.g., each day at 4:00 A.M.). A user may cause the wireless universal adapter 135 to issue a command having the effect of engaging a sensor in the field device (e.g., the API may include a RunPartialStrokeTest command). Many additional uses for remote administration of the wireless universal adapter 135 and/or field devices by a user accessing the user communicator 140 are envisioned. A user may configure the wireless universal adapter 135 to automatically collect data and transmit the data to the asset management system 68.

Furthermore, alternate protocol conversion configurations are possible. For example, the response from the field device may be only partially converted prior to transmission to the user communicator 140. For example, the wireless universal adapter 135 may have limited processing capabilities, or more in-depth processing may be necessary. In that case, data obtained from field devices may be transmitted in translated and/or untranslated form. The wireless universal adapter 135 may include a mode in which data obtained from a field device is sent uninterpreted to another computer (e.g., to a user interface device 75) for further processing.

Moreover, although the above examples describe a wired connection between the wireless universal adapter 135 and the field device, wireless connections are possible. For example, a WirelessHART field device may transmit data via a wireless connection to the wireless universal adapter 135. In this case, the wireless universal adapter 135 may be a standalone device that does not receive power via a wired connection to a field device. The wireless universal adapter 135 may proxy communications in one protocol (e.g., HART) from the WirelessHART device to another location (e.g., by transmitting the HART-encoded data).

It is noted that although FIG. 1 only illustrates a single controller 11 with a finite number of field devices 15-22 and 40-46, wireless gateways 35, wireless adaptors 52, access points 55, routers 58, and wireless process control communications networks 70 included in the example process plant 5, this is only an illustrative and non-limiting embodiment. Any number of controllers 11 may be included in the process control plant or system 5, and any of the controllers 11 may communicate with any number of wired or wireless devices and networks 15-22, 40-46, 35, 52, 55, 58 and 70 to control a process in the plant 5. Although only one wireless universal adapter 135 and one user communicator 140 are depicted, any suitable number of each may be deployed in the field environment 122. Although only one network 145 is depicted, any number of suitable networks may be developed and deployed. For example, a first network 145 may be used for inter-field device communication, whereas a second network 145 may be used for communication from the field device 135 to the configuration application 72a. The wireless universal adapter 135 may join the first network 145 and the second network 145 simultaneously.

The benefits of the above-described techniques are many. First, field devices may be accessed and controlled more efficiently. Historically, field devices may pass diagnostics using native protocols, which are slow and may only be used intermittently. For example, data passed from a field device directly to the asset management system 68 via the backbone 10 may first pass through an automation system, thus introducing a layer of communication resulting in latencies and/or bandwidth constraints, and preventing the asset management system 68 from receiving real-time diagnostic information from the field devices. By including additional wireless networks, bandwidth is amplified.

Second, hardware is utilized more efficiently, lowering costs. In some cases, the wireless universal adapter 135 may be optimized via store and forward on exception to the asset management system 68. For example, the asset management system 68 may be inherently limited in the number of field devices with which the asset management system 68 may communicate in a given window of time. By adding the wireless universal adapter 135 to the field environment 122, the wireless universal adapter 135 polls an associated device (e.g., a field device that the wireless universal adapter 135 is wired to) more frequently for data, and then stores/forwards that data to the asset management system 68 via the wireless gateway 35 or another computer network. By the wireless universal adapter 135 asynchronously pushing data to the asset management system 68 in this way, resources within the process plant 5 that would otherwise be needed to initiate polling of the field device are freed for other tasks, thereby reducing overall load. Insofar as overall load is reduced, the asset management system 68 can accommodate a larger scale of devices communicating more frequently.

Third, users may access and control field devices more conveniently in a way that is safer for the users and the devices. A user located in the back-end environment 125 may, without leaving the back-end environment 125, configure and/or calibrate the wireless universal adapter 135 via the user communicator 140 and/or network 145, without opening an end cap of a field device and without exposing the electronics located therein. For many tasks, including configuration, a user is required to open the device housing of the process monitoring sensor (e.g., remove the housing of a field device) to physically connect the user communicator 140 to the process monitoring sensor to communicate with the process monitoring sensor. The user may be required to replace the housing when the user is finished working with the field device. Opening a field device is time-intensive, can damage aspects of the field device (e.g., an O-ring, hinge, and/or packing), can void hazardous area certifications of the field device, may require time-intensive acquisition of additional permits (e.g., "hot work" permits) for access, and can expose the sealed inner workings of the field device to contaminants. However, a user can use the user communicator 140 and the network 145 to achieve remote access and control over a field device that has historically required direct physical access to the device.

Fourth, the need for specific automation-specific interfaces in the asset management system 68 may be eliminated. Any hardware and/or logical resources currently devoted to the collection of data from field devices and the conversion of that data may be released and/or reallocated.

Fifth, the field engineer or maintenance user's physical demands are lessened. Because the present techniques enable remote administration of field devices, such users no longer need to carry large amounts of hardware with them in order to service field devices in the field. Furthermore, the unified user communicator 140, which can access any field device, allows the field engineers to reduce the amount of computing hardware that they need if they are required to service a field device in the field environment 122.

Figure 2:
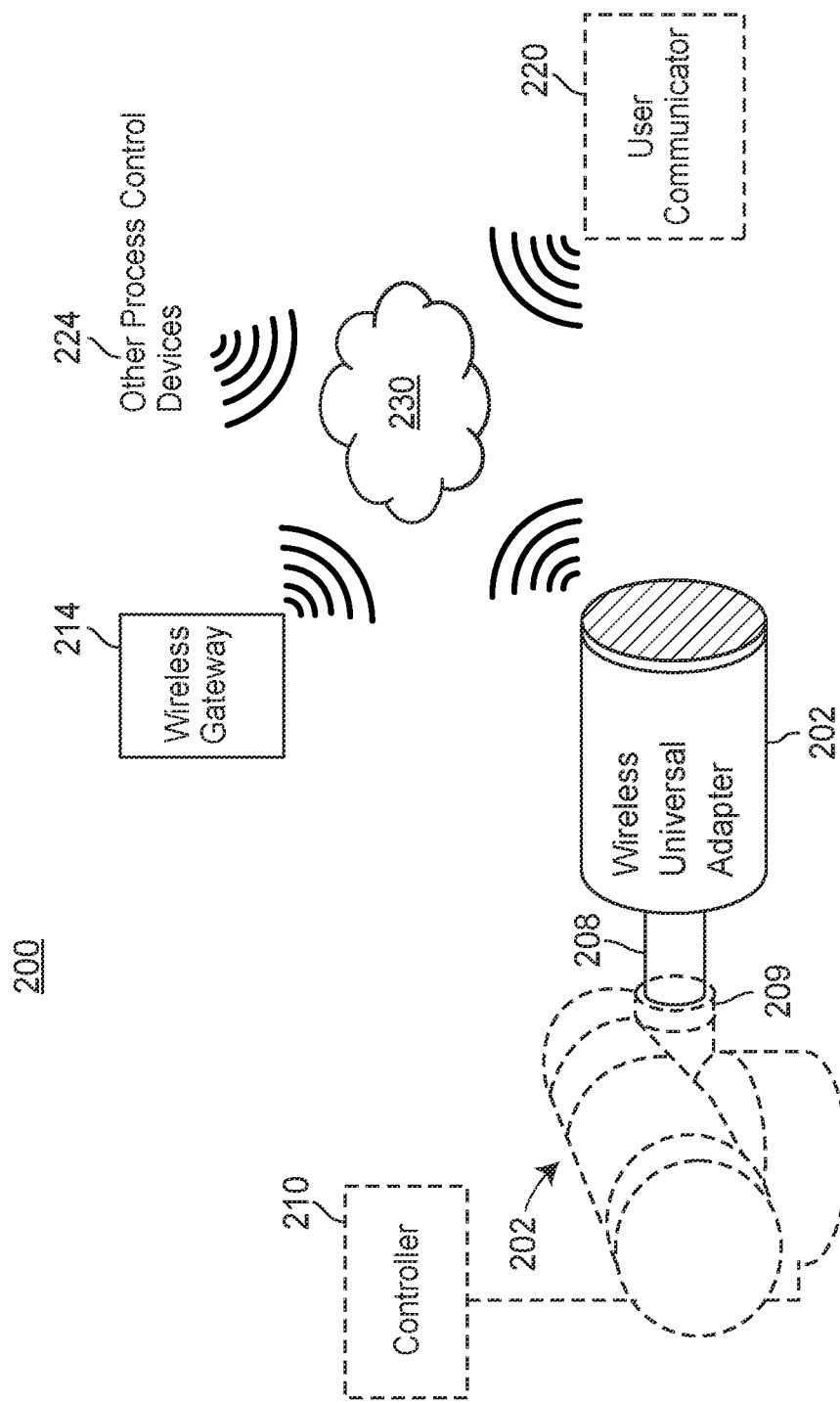
FIG. 2 depicts an example process plant environment for performing data collection, data storage, and protocol conversion techniques.

FIG. 2 illustrates an example environment 200 in which a field device 202 coupled to a wireless universal adapter 205 may be deployed and used. Generally, the field device 202 may correspond to one of the field devices depicted in FIG. 1 (e.g., one of wired field device 15-18, one of field devices 19-22, etc.). The wireless universal adapter 205 may correspond to the wireless universal adapter 135, for example. In operation, the field device 202 may be installed and/or configured to include the wireless universal adapter 205. The field device 202 and wireless universal adapter 205 may be coupled by a conduit 208. The conduit 208 may include a plug 209. The plug 209 may be a plug existing in field devices (e.g., the field device 202) which may be removed by a user to allow additional components, such as the wireless universal adapter 205, to be attached/joined to the existing field device 202 via the conduit 208 (e.g., by snaking wires through the conduit 208).

The environment 200 may also include a controller 210 to which the field device 202 is communicatively coupled. The controller 210 may correspond to the controller 11 of FIG. 1, in some embodiments. The environment 200 may include a wireless gateway 214, a user communicator 220, and other process control devices 224, which may be communicatively coupled by a network 230. The wireless gateway 214 may correspond to the wireless gateway 35 of FIG. 1, and the user communicator 220 may correspond to the user communicator 140. Generally, the wireless gateway 214 (also referred to herein as a "server device" or "wireless hub") may correspond to a centralized BLE-enabled communication platform within the field environment 122 of FIG. 1. The wireless gateway 214 may communicate with multiple wireless universal adapters 205 within the larger plant environment to collect, store, route, and/or other receive and transmit information and data to/from the wireless universal adapters 205. The other process control devices 224 may correspond to other devices within the process control plant 5 that are BLE enabled or capable of utilizing any other suitable communication protocol. The network 230 may correspond to the network 145.

In operation, the field device 202 may be deployed with, or retrofitted/upgraded to include, the wireless universal adapter 205. The wireless universal adapter 205 may be attached to the field device by way of the conduit 208. With respect to the wireless universal adapter 205, the conduit 208 may be a hollow tube of any suitable length, thickness, and diameter capable of being attached at a proximal end to the wireless universal adapter 205, and capable of being attached at a distal end to the field device 202. The attachment mechanism of the proximal end and/or the distal end may be any suitable attachment mechanism, such as a proprietary coupling, a threaded attachment point having a standard thread pitch, a friction seal, etc. The conduit 208 may include gaskets at either end in order to create an air or watertight seal. As discussed in detail below, wiring laid within the conduit 208 may provide electric power to the field device 202 and the wireless universal adapter 205, and the same wires may be used to transmit data between the field device 202 and the wireless universal adapter 205.

Once the field device 202 and wireless universal adapter 205 are powered on, the wireless universal adapter 205 and/or field device 202 may transmit data (e.g., in response to a polling operation) to the controller 210. As discussed with respect to FIG. 1, the wireless universal adapter 205 may also collect data from the field device 202, convert that data, and transmit converted data wirelessly via the wireless gateway 214 to and/or from the user communicator 220 over the network 230. For example, a user of the user communicator 220 may select one or more wireless universal adapters 205 via a user interface and then issue a configuration, calibration, maintenance, or other command. The command may be transmitted via the network 230 to the wireless universal adapter 205. In some cases, the command may be an API call including an HTTP request (e.g., a GET or POST request) having a payload. The payload may specify parameters. For example, a parameter may specify that the wireless universal adapter 205 is to instruct a particular field device to perform a particular function (e.g., initiate a short stroke test, transmit data, connect to a computer network, etc.). Based on the payload, the wireless universal adapter 205 may generate an instruction encoded for the particular protocol of the field device 202, and issue the instruction to the field device 202.

The wireless universal adapter 205 may include an API or other application for analyzing such command payloads and taking appropriate action when one is received from the user communicator 220. In some cases, the command may be transmitted via an authenticated and/or encrypted communication channel (e.g., authenticated HTTPS) to prevent eavesdropping and/or impersonation. As noted, the addition of the wireless universal adapter 205 to the field device 202 may allow the wireless universal adapter 205 to transmit data of the field device in real-time to other components of the environment, and to avoid overloading the controller 210, and to avoid saturating the network 230 or another network. Because the field device 202 may communicate via the network 230, which may be segregated from the default network (e.g., the backbone 10), data may be transmitted from the field device 202 without affecting the performance of the default network, and with low latencies (i.e., in real-time or near real-time).

Figure 3:
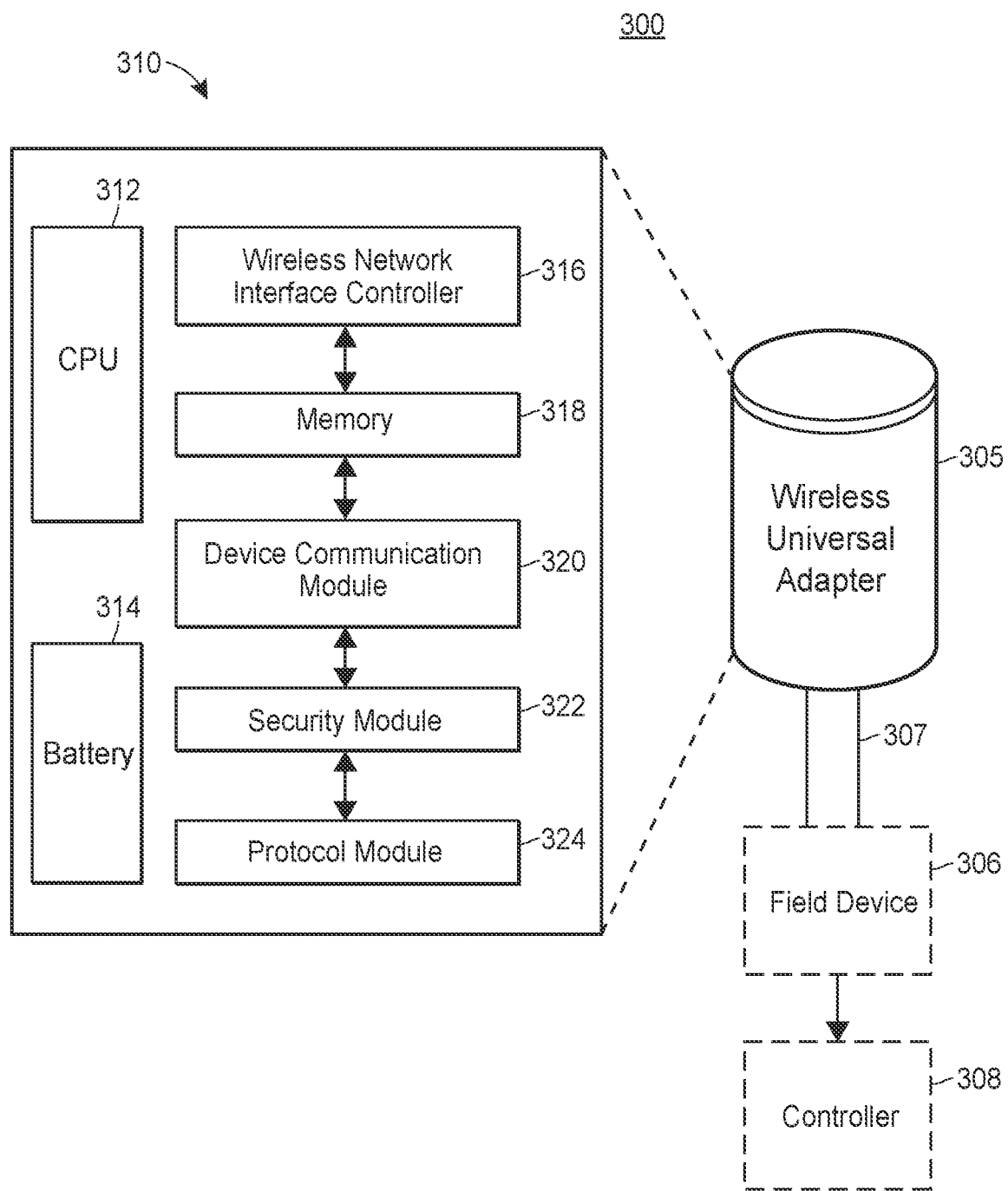
FIG. 3 depicts a block diagram illustrating an example wireless universal adapter in communication with various components of a process plant.

FIG. 3 depicts an example system 300 featuring a wireless universal adapter 305. The wireless universal adapter 305 may correspond to the wireless universal adapter 135 and/or the wireless universal adapter 205. The wireless universal adapter 305 may be coupled to a field device 306 via a conduit 307. The field device 306 may correspond to any of the field devices depicted in FIG. 1 (e.g., any of devices 19-22). The conduit 307 may correspond to the conduit 208. The field device 306 may also communicate with a controller 308, which may correspond to the controller 11 and/or the controller 210.

As illustrated in the expanded block 310, the wireless universal adapter 305 may include a number of components, including a central processing unit (CPU) 312, a removable or replaceable battery 314, a wireless network interface controller (NIC) 316, a memory 318, a device communication module 320, a security module 322, and a protocol module 324. The CPU 312 may execute computer executable instructions. The battery 314 may hold a charge, which may allow the wireless universal adapter 305 to continue to function (e.g., to continue to collect data) in the event of a power loss, in some embodiments, or which may provide primary power to the wireless universal adapter 305. In some cases, the battery 314 may allow the deployment of the wireless universal adapter 305 on a temporary basis. For example, the wireless universal adapter 305 may be used for short-term deployment and/or monitoring scenarios. Many forms of ad-hoc use of the battery-powered wireless universal adapter 305 are envisioned. Still further, the device 405 may have a battery cover that can be easily removed to replace the battery 314 in the field without needing to remove the cover of the field device to which the wireless universal adapter 305 is connected. In some configurations, the CPU 312 is a multi-core processor or processor that has co-processing capabilities (e.g., quantum, cell, chemical, photonic, bio-chemical, biological processing technologies, and/or other suitable co-processing technologies). The CPU 312 may include one or more Graphics Processing Unit (GPU). It should be appreciated that although only one CPU 312 is shown in FIG. 3, the wireless universal adapter 305 may include two or more CPU 312.

Although only one NIC 316 is depicted, the wireless universal adapter 305 may include one or more NIC 316 via which one or more respective links to one or more respective communication or data networks are accessed. The one or more NIC 316 may include interfaces to one or more general-purpose computing communication and/or data networks, e.g., BLE, Ethernet, NFC, RFID, Wi-Fi, etc. A link to a communication or data network may be as a memory access function, and/or a link may be a wired, wireless, or multi-stage connection. Many types of interfaces and links are known in the art of networking and may be used in conjunction with the wireless universal adapter 305. Furthermore, the wireless NIC 316 may include one or more hardware and/or software network interfaces, such as Ethernet adapters and/or WiFi adapters. The wireless NIC may include any suitable hardware transmitter for receiving and sending data according to any known wireless networking protocol now known or later developed (e.g., a BLE and/or general Bluetooth® transceiver). In some embodiments, it may be beneficial for the operator of the wireless universal adapter 305 to add one or more virtual network interfaces to the wireless NIC 316, to permit the wireless NIC 316 to send and receive network traffic in userspace (e.g., by unprivileged applications).

The memory 318 may permanently store data related to the computer executable instructions, and may include a random-access memory (RAM) for temporarily storing data related to the computer executable instructions. The memory 318 may be used as an on-device cache, and may buffer data in temporary memory and/or a persistent memory. For example, if the wireless universal adapter 305 seeks to push data collected from a field environment such as the field environment 122, and a receiver of the data such as the asset management system 68 or the data historian application 73a is unable to be reached, or is unable to receive data (e.g., due to a full memory of the receiver of the data), then the wireless universal adapter 305 may continually write the data to the on-device cache in memory 318 until such time that the data may be later retrieved, received, and/or transmitted. In some embodiments, the cached data may be compressed by the CPU 312, and/or deleted/rotated periodically (e.g., once every hour). Caching is a significant improvement over allowing the data that cannot be transmitted on schedule to be lost. Further, caching is beneficial because at any time, a user may collect data from the wireless universal adapter 305 relating to the status of the field device 306 (e.g., the time/date of the last calibration) without accessing the field device 306. Caching results in providing users with more timely access to information and less wear and tear on major system components over time. In some configurations, the memory 318 and/or the RAM are implemented using high-density memory technology, such as solid state drive memory, flash memory, semiconductor memory, optical memory, molecular memory, biological memory, or any other suitable high density memory technology. The memory 318 of the wireless universal adapter 305 may include multiple RAMs. The RAM(s) may be implemented as one or more semiconductor memories, flash memories, magnetically readable memories, optically readable memories, biological memories, and/or other tangible, non-transitory computer-readable storage media, for example.

The wireless universal adapter 305 includes one or more sets of particular computer executable instructions stored in the memory 318, which may be loaded into the RAM by the CPU 312 and executed by the CPU 312 to cause certain functions to occur. As such, the wireless universal adapter 305 is particularly configured at least in part by the particular one or more sets of instructions stored thereon which may include one or more engines, routines, applications, APIs, or programs. A set of applications/modules may be included as part of the one or more sets of instructions stored in the memory 318. The set of applications may be associated with the asset management system 68 and may include the device communication module 320, the security module 322, and/or the protocol module 324, as further discussed herein.

The device communication module 320 may send, receive, and interpret messages. For example, the device communication module 320 may respectively transmit, receive, and/or interpret messages encoded in process control protocols (e.g., Highway Addressable Remote Transducer Protocol, Fieldbus Protocol, Profibus Protocol, or Modbus Protocol) and general purpose computing communication formats (e.g., Bluetooth®, WiFi, etc.) via the NIC 316. The device communication module 320 may include instructions that, when executed, bind to one or more sockets of the NIC 316, allowing client applications to connect (e.g., a representational state transfer (REST) API). The device communication module 320 may include computer-executable instructions implementing the API discussed with respect to FIG. 1, which allows a user communicator to send commands to the device communication module 320.

The device communication module 320 may send and receive messages, via the wireless NIC 316, to a network (e.g., a real-time exterior network). For example, the device communication module 320 may send data to, and receive data from, the network 230 of FIG. 2. The device communication module 320 may extract a payload from data received in the wireless universal adapter 305, and the device communication module 320 may process the payload according to a set of executable instructions.

The security module 322 of wireless universal adapter 305 may securely mediate the flow of information between device communication module 320 and other modules. The security module 322 may include a set of routines and/or instructions for encrypting and decrypting information, such as asymmetric key encryption algorithms, symmetric key encryption algorithms, or other suitable encryption schemes/ciphers, as discussed further herein. The security module 322 may be a secure access service, such as an OpenSSH server, which allows users to connect to a shell of an operating system (e.g., Linux) of the wireless universal adapter 305 that is executing in a module of the wireless universal adapter 305, and to securely issue commands as an unprivileged and/or privileged user of the operating system, wherein the commands have the effect of changing the state of the wireless universal adapter 305.

The wireless universal adapter 305 may include a protocol module 324. The protocol module 324 may be responsible for performing low-level translation, identification, and processing functions with respect to messages encoded in one or another specific process control formatted-data (e.g., DeviceNet). As discussed with respect to FIG. 3, the wireless universal adapter 305 may be linked to a first wired post (e.g., a no loop 2-wire link, a powered link, a 4-wire link, etc.) of the field device 306. The field device 306 may be similarly linked via a second post of the field device 306 to another field device, the controller 308, etc. In embodiments, the function of the protocol module 324 may be to send and/or receive data to and/or from the field device 306 over the link. For example, data generated by the field device 306 to the wireless universal adapter 305 may not be capable of being interpreted by, for example, the security module 322 of the wireless universal adapter 305. Similarly, data generated by the device communication module 320 of the wireless universal adapter 305 may not be capable of being interpreted by, for example, the field device 306. Therefore, the protocol module 324 may translate data transmitted between the wireless universal adapter 305 and the field device 306. One or more protocols 324 may be installed in the wireless universal adapter 305, to allow the wireless universal adapter 305 to receive and transmit data generated by, and/or destined for, a plurality of different types of field devices.

The protocol module 324 may include a library of routines for translating commands from a user communicator encoded in a general-purpose computing data format to a corresponding message encoded in a process protocol data format, and for encoding responses encoded in a process control data format into a general-purpose computing data format. For example, the protocol module 324 may be able to transform a message in one process control protocol (e.g., Profibus Protocol) to a corresponding message encoded in another process control protocol (e.g., Fieldbus Protocol) and vice versa.

The above-described arrangement of modules for performing the functions of the process plant related to the wireless universal adapter 305 are but some possible arrangements. Many other possible arrangements are envisioned.

Exemplary Wireless Universal Adapter Analytics/Diagnostics Techniques

Figure 4:
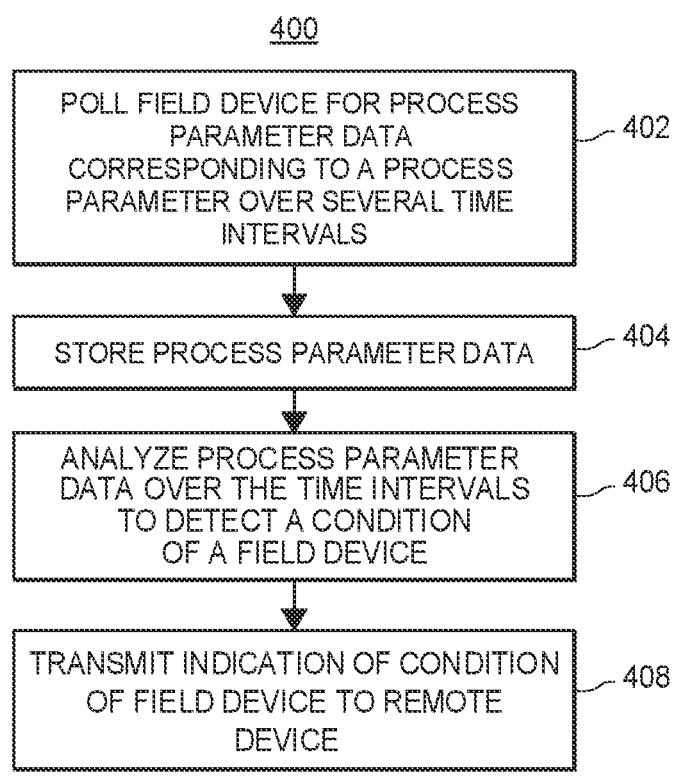
FIG. 4 depicts an example method for field device data collection and condition detection using a wireless universal adapter.

FIG. 4 depicts an example method 400 for field device data collection and condition detection using a wireless universal adapter. Generally, to detect conditions at or of field devices, the wireless universal adapter may poll the field device(s) to receive process parameter data over several instances in time for process parameters corresponding to the field device.

Accordingly, the method 400 may include polling a field device for process parameter data corresponding to a process parameter over several time intervals (block 402). The process parameter data may be encoded in a field device transmission protocol (e.g., HART, Profibus, etc.). The wireless universal adapter may include a transmitter for communicating with the field device via a first communication link and a wireless network interface controller for communicating with remote devices via a second communication link. For example, the process parameter data may be polled in response to a command issued by a field communicator, such as a user communicator. The process parameter data may be organized in any suitable data structure, such as a packed array, a hash table, a string, etc. In embodiments, the wireless universal adapter may retrieve the process parameter data over a plurality of communication channels. In embodiments, the wireless universal adapter may receive, via a wireless network interface controller, process parameter data corresponding to a process parameter for another field device. Block 402 may be performed by, for example, the wireless universal adapter 135, 205, 305.

Generally though, process parameter data may include set points or measured values within the process plant of materials flowing through the process plant or of devices which perform physical functions to control the process (e.g., valve parameters, field device parameters, controller parameters, etc.). For example, process parameter data may include a temperature, pressure, flow rate, mass, volume, density, area, etc. of a material flowing through the process plant or set points thereof. Process parameter data may also include a drive signal, travel, pressure, temperature, etc. of a device which performs physical functions to control the process (e.g., a valve) or set points thereof. Furthermore, process parameter data may include device alerts. Moreover, the process parameter data may be received in a secure manner, such as by using encryption techniques (as described in more detail below), firewalls, via a data diode, or any other suitable security mechanisms.

The method 400 may continue by storing at least some of the process parameter data (block 404). At least some of the process parameter data may be stored locally at the wireless universal adapter, and some of the process parameter data may be transferred to another suitable storage location (e.g., a wireless hub), utilized for analysis, and/or deleted. Block 404 may be performed by, for example, the wireless universal adapter 135, 205, 305.

In any event, the method 400 may continue by analyzing the process parameter data over the time intervals to detect a condition of a field device (block 406). Generally speaking, the wireless universal adapter may perform any suitable set of analytics or diagnostics using the process parameter data to prepare the results for transmission to a remote device. For example, and as previously mentioned, the analytics techniques the wireless universal adapter may perform may include FIELDVUE™ diagnostics, time series analysis, and acquiring variable information from surrounding devices/sensors (e.g., field devices) to time correlate the external device data with the device associated with the wireless universal adapter. The wireless universal adapter may perform these analytics functions at a pre-determined frequency and schedule, or upon receipt of a request/command from a remote device, such as a user communicator.

Block 406 may be performed by, for example, the wireless universal adapter 135, 205, 305.

More specifically, the FIELDVUE™ diagnostics conducted by the wireless universal adapter 135 may include actions such as: a PD One Button, a PD Friction Trend, a Triggered Profile, a Partial Stroke Test, a Solenoid Valve Test, a Total Scan (which may require a step to take a valve out of service prior to the wireless universal adapter 135 conducting its analysis), and/or a Predefined Step Response test (e.g., a calibration check) (which may require a step to take a valve out of service prior to the wireless universal adapter 135 conducting its analysis). Typically, these diagnostics may be performed by an external software application requiring special commands to retrieve the associated data and execute the diagnostics. By contrast, the WUA may automatically issue commands to retrieve and store this data and to execute the corresponding diagnostics. In this manner, the WUA may streamline the diagnostics process associated with field devices.

The time series analysis may generally involve collecting and analyzing process parameter data representative of multiple instances in time for a field device. More specifically, the wireless universal adapter 135 may perform time series analysis such as: an actuator diaphragm/elastomer life evaluation, a rotary seal health evaluation, a seat load degrading evaluation, a friction factor changing evaluation, and/or a high cycle evaluation (e.g., a cycle rate changing evaluation, a dead time changing evaluation, a stroke times changing evaluation, etc.). The wireless universal adapter 135 may generate and store/transmit results of the analytics such as, but not limited to, a red alert, a yellow alert, a green alert, a health score, a remaining useful life, etc. that may be transmitted from the wireless universal adapter 135 to a user communicator 140 or potentially to the back-end environment 125 for display at an operator workstation 71.

The wireless universal adapter 135 may also acquire process parameter data from surrounding device/sensors via BLE and store it with the process parameter data for the field device. The external data may then be time correlated with the process parameter data and analyzed as an advanced analytic. For example, potential analytics utilizing the surrounding device data may include, without limitation: a comparison of performance between similar loops, a DVC/loop tuning changes and effectiveness evaluation, a process gain analysis, a dead band analysis, a dead time analysis, a response time analysis, an overshoot analysis, and/or a valve sizing analysis.

Accordingly, in embodiments, the condition of the field device may include at least one of: a dead band, a dead time, a response time, a set point overshoot, a component degradation, a change in a friction factor, a change in a cycle rate, or a change in a stroke time. Moreover, in embodiments, the condition may include a performance monitoring metric of the field device, that may include at least one of: (i) an alert, (ii) a health indicator, and/or (iii) an estimated lifespan.

In embodiments, the wireless universal adapter may analyze the process parameter data for each of one or more process parameters, and combine the respective process parameter values of the one or more process parameters over the plurality of instances of time to generate a process parameter metric. For example, from temperature values of a material at a valve, the wireless universal adapter 135 may determine one or more process parameter metrics such as an average temperature of the material at the valve, the standard deviation in the temperature, a 20-second moving average of the temperature, and/or a 20-second decaying average of the temperature where the most recent temperature is weighted the highest and the temperature from 20 seconds earlier is weighted the lowest. The wireless universal adapter 135 may additionally or alternatively determine an amplitude and frequency in a wave created by the various temperatures collected over time. Still further, the wireless universal adapter 135 may apply various filters to the temperature values to remove noise and perform additional statistical calculations after the filters are applied.

The wireless universal adapter may further detect the condition of the field device based upon the process parameter metric. For example, and in embodiments, the wireless universal adapter may combine the respective process parameter values of the one or more process parameters by calculating at least one of: (i) a moving average of the respective process parameter values and/or (ii) a decaying average of the respective process parameter values over the plurality of instances of time to generate the process parametric metric. In these embodiments, the wireless universal adapter may perform machine learning techniques by generating a statistical model based on historical process parameter values of the one or more process parameters. The wireless universal adapter may then further apply the process parameter metric to the statistical model to identify the condition of the field device. In some embodiments, the statistical models are generated using training data which includes historical process parameter values previously produced by the field device or other field devices.

In some cases, each of the historical process parameter values or a set of historical process parameter values corresponding to a particular time window (e.g., an hour) are classified into a subset of process parameter values associated with a particular condition which occurred or was present at the field device during or associated with the time the historical process parameter values were generated. Additionally, historical process parameter values are classified into another subset of process parameter values associated with normal operation of the field device when no condition occurs or is present at the field device at or around the time the historical process parameter values were generated. The wireless universal adapter compares a subset of historical process parameter values associated with a condition to another subset of historical process parameter values that are not associated with the condition to generate the statistical model. In this manner, the wireless universal adapter identifies characteristics of the process parameters which indicate that the field device is experiencing a particular condition.

A statistical model may be, for example, a decision tree. The wireless universal adapter may generate a decision tree made up of nodes, branches, and leaves, where each node represents a test on a statistical measure (e.g., is the decaying flow rate average greater than 20?), each branch represents the outcome of the test (e.g., the decaying flow rate average is greater than 20), and each leaf represents a likelihood that the field device will experience a condition. For example, the branches of the decision tree represent likelihoods the field device will experience an error, a leak, dead band, dead time, mechanical wear, etc. Therefore, the wireless universal adapter can traverse each decision tree using process parameter metrics from the collected process plant data to determine which conditions, if any, a field device is experiencing. If the likelihood that the field device is experiencing a particular type of condition is above a threshold likelihood (e.g., 0.5, 0.7, etc.), the wireless universal adapter determines that the field device is experiencing the condition.

For example, the wireless universal adapter generates a decision tree including a first node that corresponds to whether a 20-second moving average pressure is above 25. If the 20-second moving average pressure is not above 25, a first branch connects to a first leaf node which indicates that the likelihood that the field device is experiencing mechanical wear is 0.6. If the 20-second moving average pressure score is above seven, a second branch connects to a second node which corresponds to whether the standard deviation in the temperature is above 10.

If the standard deviation in the temperature is above 10, a third branch connects to a second leaf node which indicates that the likelihood that the field device is experiencing mechanical wear is 0.75. However, if the standard deviation in the temperature is not above 10, a fourth branch connects to a third leaf node which indicates that the likelihood that the field device is experiencing mechanical wear is 0.25. While the decision tree includes three leaf nodes and four branches, this is merely an example for ease of illustration only. Each decision tree may include any number of nodes, branches, and leaves, having any suitable number and/or types of tests on process parameter metrics.

In any event, by combining and/or aggregating several decision trees as in random forests or boosting methods, the wireless universal adapter identifies the process parameter metrics which are the most important for determining the likelihood that a field device is experiencing a particular type of condition. The most important process parameter metrics are those that most frequently result in early splitting of the decision trees and are most indicative of whether or not a field device is experiencing a condition. Referring to the example decision tree above, the 20-second moving average pressure may be more important than the standard deviation in the temperature, because the standard deviation in the temperature appears lower in the tree than the 20-second moving average pressure. Therefore, in this example, 20-second moving average pressure is the most important process parameter metric.

In some embodiments, process parameter metrics are assigned weights according to their respective levels of importance. The wireless universal adapter uses the assigned weights when generating the statistical models. In some scenarios, a process parameter metric which is the least important may be weighted by a factor of 0 or almost 0 to filter out the process parameter metric from the statistical model.

By comparing the calculated statistical measures of the field device(s) or other suitable process control entity to the decision tree, the wireless universal adapter may determine that a particular condition is occurring or is present at the field device(s), such as excessive dead band (e.g., dead band which exceeds an allowable threshold). The wireless universal adapter may then transmit an indication of the detected condition to a user interface device, such as an operator workstation, to alert an operator to the condition. For example, when a valve in the process control system experiences excessive dead band, the operator is alerted of this condition and can examine the valve to address the issue.

In some scenarios, such as when the field device(s) is a valve, the wireless universal adapter may determine the mode of operation for the field device(s) or valve (e.g., full stroke cycling, continuous throttling, periodic throttling, etc.) based on the received process parameter data or valve data. For example, the mode of operation for a valve is determined based on received process parameter values for process parameters corresponding to the valve, e.g., is determined based on received valve parameter values corresponding to the valve for one or more valve parameters. The wireless universal adapter may apply a set of rules to the process parameter values and/or use machine learning techniques to determine the mode of operation of the valve.

Based on the determined mode of operation of the valve, the wireless universal adapter may compare statistical measures for the valve (which are determined from the valve data) to a statistical model specifically generated based on valves operating in the determined mode. In some embodiments, the wireless universal adapter may generate the one or more mode-specific statistical models. For example, the wireless universal adapter may generate a statistical model for detecting valve conditions using historical process parameter values from valves operating in the full stroke cycling mode. The wireless universal adapter may generate another statistical model for detecting valve conditions using historical process parameter values from valves operating in the continuous throttling mode, and a third statistical model for detecting valve conditions using historical process parameter values from valves operating in the periodic throttling model. Using the statistical model for the determined mode of operation and the received valve data, the wireless universal adapter may detect or identify a condition occurring at the valve.

Also in some scenarios, such as when the field device(s) is a valve, the wireless universal adapter may compare valve data (valve or process parameter values) for multiple valves in the same process plant, enterprise, industry, or across all industries. The wireless universal adapter then determines the condition (e.g., health) of the subject valve relative to the other valves and transmits an indication of the comparison (e.g., a relative health indicator) to a user interface device for display to an operator or to another computing device or application. For example, the user interface device displays a rankings list of each of the valves or presents valve data side-by-side for each of the valves in a graphical depiction. Additionally, the comparison is used as a further measure of the condition of the valve. For example, when the valve data is compared to a statistical model generated using historical process parameter values, the wireless universal adapter may determine that the valve is experiencing excessive dead time (e.g., dead time above an allowable threshold). However, when the valve is compared to all other valves in the same industry, the wireless universal adapter may determine that the dead time the valve is experiencing is about average within the industry and therefore the dead time is within an acceptable range.

In embodiments, the wireless universal adapter may be a BLE hub or may communicate the process parameter data to a BLE hub which performs the analytics/diagnostics to better accommodate power/processing/other restrictions associated with the field device and/or the process control data highway. Moreover, if a particular field device to which the wireless universal adapter is affixed communicates using HART as its native protocol, the field communicator may be configured to communicate over a primary communication channel, a secondary communication channel, or both. The wireless universal adapter may utilize both primary and secondary channels to increase speed. In these embodiments, if a secondary communication channel is detected, the wireless universal adapter may revert to communicating over a primary communication channel until the secondary communication ceases.

The method 400 continues by transmitting an indication of the condition of the field device to a remote device (block 408). Generally, the wireless universal adapter may transmit the indication of the condition of the field device by the one or more processors via the wireless network interface controller to, for example, a user communicator (e.g., user communicator 140). Block 408 may be performed by, for example, the wireless universal adapter 135, 205, 305.

In embodiments, the wireless universal adapter may be capable of storing the variable information and any analysis results for a configurable amount of time. Since the memory capacity requirements for each variable may be small, a large collection of analysis results may be stored on the wireless universal adapter. The wireless universal adapter may then be able to communicate the stored variable and analysis information to a remote device or system (e.g., user communicator) via a high-speed wireless protocol, typically BLE. This information may be the raw data and/or the alerts generated from the analytics. The wireless universal adapter may transmit this information on an ad-hoc basis (e.g., as a technician might do during a round or troubleshooting an instrument) or on a continuous basis via an external wireless hub (e.g., a BLE hub) for communication back to components of the field environment (e.g., user communicator, etc.) and/or components of the back-end environment (e.g., the asset management system, etc). The stored data may then be uploaded to a specific app, asset management system, etc. later for additional analysis and/or permanent storage.

Additionally or alternatively, the wireless universal adapter may transmit this information via a paired/connected link or advertising, such as the process parameter data used to detect a condition, an indication of the detected condition, and/or other information associated with the detected condition, such as the severity of the condition, the type of condition, etc. For example, the wireless universal adapter may poll the field device and broadcast data as JSON, XML or other scripts to client devices within a threshold communication range of the wireless universal adapter. In another example, a client device may request to connect with the wireless universal adapter, and the wireless universal adapter may pair with the client device and transmit the data to the paired client device via scripts. These scripts may be interpreted on any client browser, thus eliminating the need to develop and distribute apps. In response, a remote device or system (e.g., user communicator) may then display and store this information. The process parameter data may then be deleted from the wireless universal adapter to free up space for additional data. For example, the remote device may transmit an acknowledgement message to the wireless universal adapter indicating that the process parameter data/detected condition information was received. As a result, the wireless universal adapter may remove the process parameter data/detected condition information that was transmitted to the remote device.

When the condition of the field device becomes known (e.g., an operator evaluates the field device to determine whether any condition is occurring at the field device), the process parameter values are added to the historical process parameter values, and the corresponding statistical model may be updated accordingly.

Exemplary Alert Recording and Historization Techniques

Typically, alerts associated with a field device may be communicated by a protocol (HART, Foundation Fieldbus, Profibus, etc.) to a remote device or system (handheld like Trex or distributed control system) when requested, and may be generated by the field device control unit at the moment they occur. The alerts may then be presented on the display of the handheld device. The problem associated with traditional systems employing this methodology is that the alerts may readily go unnoticed. For example, if there is no remote device around to "hear" the alert, the alert may be broadcast and not captured by any remote device. Similarly, even when there is a remote device or system connected, the frequency of polling is often too slow or infrequent to catch the alert before it goes away. Thus, it is difficult to "latch" the alert so that it is retained in device memory for a remote device to access it later using conventional technologies.

Figure 5:
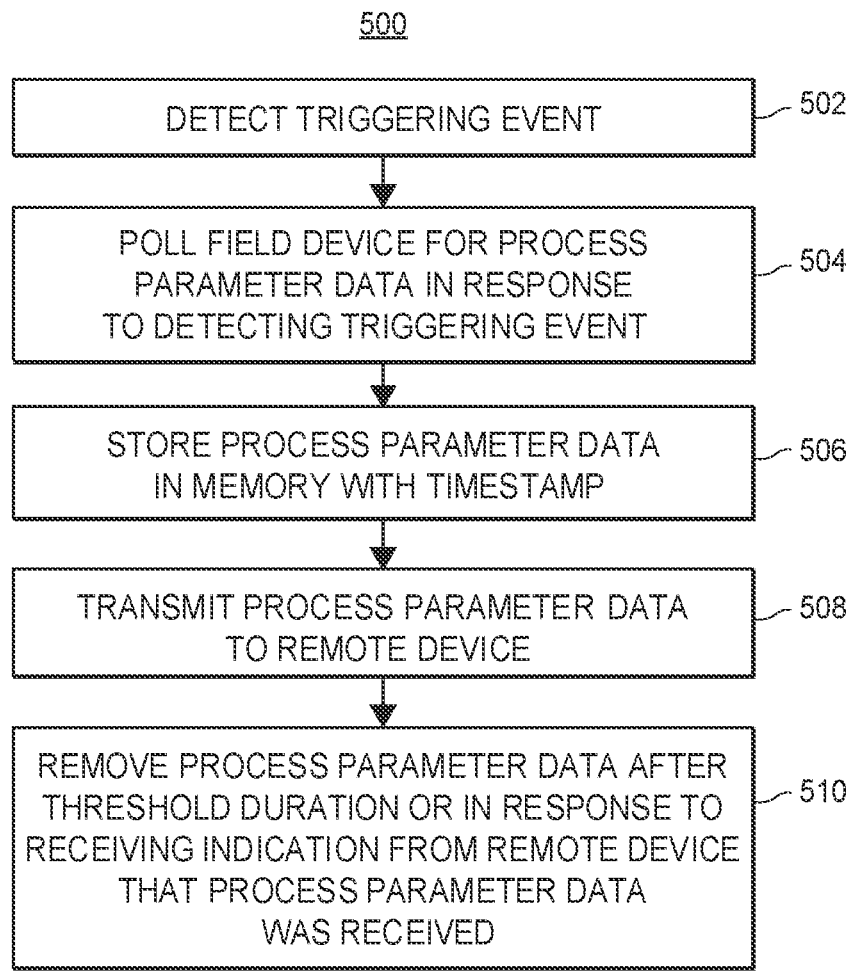
FIG. 5 depicts an example method for field device data collection and transmission in response to detecting a triggering event using a wireless universal adapter.

FIG. 5 depicts an example method 500 for field device data collection and transmission in response to detecting a triggering event using a wireless universal adapter. Generally, the wireless universal adapter may have a trigger to define when process parameter should be stored to maximize memory capacity. Namely, the wireless universal adapter may trigger data collection based upon alerts associated with the corresponding field device, such that the wireless universal adapter generates an alert record associated with the corresponding field device. Accordingly, the method 500 begins by detecting a triggering event (block 502). The trigger may be based on an alert associated with the corresponding field device, a process variable value that exceeds a predetermined threshold value, etc. For example, the wireless universal adapter may issue commands to collect field device diagnostic data associated with a valve based on an evaluated travel of the valve. When the valve is closed/open the wireless universal adapter may detect the end of the valve's travel and trigger data collection. Block 502 may be performed by, for example, the wireless universal adapter 135, 205, 305.

The method 500 may continue by, in response to detecting the triggering event, polling a field device(s) to retrieve process parameter data associated with the field device(s) (block 504). In embodiments, the wireless universal adapter may retrieve the process parameter data over a plurality of communication channels. For example, if a particular field device to which the wireless universal adapter is affixed communicates using HART as its native protocol, the wireless universal adapter may be configured to communicate over a primary communication channel, a secondary communication channel, or both. The wireless universal adapter may utilize both primary and secondary channels to increase speed.

Further, in embodiments where the triggering event is an alert the instructions may cause the wireless universal adapter to retrieve, from the field device via the transmitter, alert information for the alert encoded in a field device transmission protocol. Block 504 may be performed by, for example, the wireless universal adapter 135, 205, 305. The alert information may include a type or priority of the alert, such as a red, yellow, or green alert, a critical alert, a warning, etc. The alert information may also include information regarding the cause of the alert, such as a field device component which is the subject of the alert or process parameter data which caused the alert, or may include other process parameter data associated with the alert. Additionally, the alert information may include any other suitable information related to the alert.

The method 500 may continue by storing the process parameter data in memory along with an indication of a time in which the process parameter data was retrieved (block 506). Generally, the wireless universal adapter may generate or retrieve a timestamp to be included with the process parameter data to serve as the indication. The timestamp may be generated for the time in which the process parameter data is received at the wireless universal adapter. In embodiments, the wireless universal adapter may store the process parameter data in a format indicated by a field device transmission protocol. For example, if the field device associated with the wireless universal adapter communicates using the HART protocol, the wireless universal adapter may store the process parameter data retrieved from the field device in the HART protocol format. Block 504 may be performed by, for example, the wireless universal adapter 135, 205, 305.

The method 500 may continue by transmitting the process parameter data to a remote device (block 508). Generally, the wireless universal adapter may transmit the process parameter data via the wireless network interface controller to a remote device, such as a user communicator. More specifically, the wireless universal adapter may broadcast the process parameter data (e.g., alerts, variables, spec sheet, etc.) to a remote device without a connection to the field device. For example, a plant technician may receive a notification from a valve that the valve has a problem without initiating communication to the valve. As the tech walks through the plant, the valve may continually broadcast alert information via the wireless universal adapter. The tech may receive the broadcast information via a user communicator (e.g., executing a mobile application) wherein the technician may be notified of the issue. Once received, the broadcast information from the wireless universal adapter may be passively stored on the techs handheld device for later upload into an asset management system or used to facilitate a control valve monitoring contract or other control/diagnostic process. In embodiments, the remote device may be either a user device or a server device. Block 508 may be performed by, for example, the wireless universal adapter 135, 205, 305.

In embodiments, to transmit the process parameter data, instructions stored on a memory coupled to the wireless universal adapter may cause the wireless universal adapter to broadcast, via the wireless network interface controller, the process parameter data to remote devices within a communication range of the field communicator device. Moreover, in embodiments, the process parameter data may be transmitted to the remote device in a common format independent of a field device transmission protocol in which the field communicator device retrieves the process parameter data.

In embodiments, to transmit the process parameter data, the instructions stored on a memory coupled to the wireless universal adapter may cause the wireless universal adapter to receive a request to connect to the field communicator device via a short-range communication link (e.g., BLE, Ethernet, NFC, RFID, Wi-Fi, etc.) from the remote device. The wireless universal adapter may then connect, via a short-range communication link, to the remote device. The wireless universal adapter may then also transmit, via the short-range communication link, the process parameter data to the remote device.

In embodiments, the wireless universal adapter may be a BLE hub or may communicate the process parameter data to a BLE hub which stores the process parameter data to better accommodate power/processing/other restrictions associated with the field device and/or the process control data highway The method 500 may continue by removing the process parameter data from the memory after a threshold duration or in response to receiving an indication from the remote device that the process parameter data was received (block 510). For example, the remote device may transmit an acknowledgement message to the wireless universal adapter indicating that the process parameter data was received. As a result, the wireless universal adapter may remove the process parameter data that was transmitted to the remote device. In another example, the wireless universal adapter may set a timer (e.g., one hour, two hours, one day, etc.) when process parameter data is received from the field device, and may remove the process parameter data from the memory upon expiration of the timer. The threshold duration for storing the process parameter data may be configurable. In this manner, the wireless universal adapter may maximize its internal memory capacity by rotating (e.g., removing) stored alerts and other process parameter data from memory once they are successfully received by a remote device. Consequently, the example method 500 also optimizes alert recording and historization practices by ensuring that all process parameter data and alerts are successfully communicated to a remote device once they are generated.

Exemplary Firmware Updating and Cryptographic Techniques

Problematically, for most plants, if a technician has a field communicator, they may have complete access and ability to change the configuration of a device and move the device and/or simulate the process. Further, to troubleshoot or maintain the field device, the terminal typically needs to be opened and field communicator leads are attached to the field wiring or directly to the device terminals. This has the potential for shorting out the control signal and affecting the process, all of which may violate hazardous area approvals and/or require time-intensive acquisition of work permits, depending on the field device.

Figure 6:
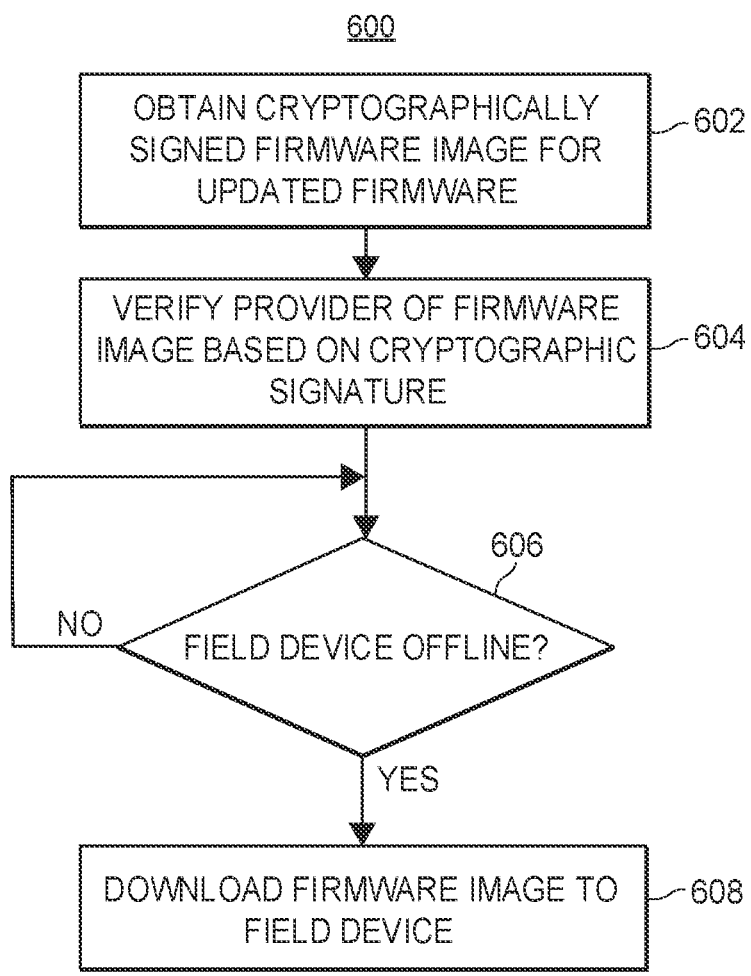
FIG. 6 depicts a flowchart of an example method for updating firmware of a field device using a wireless universal adapter.

To alleviate these and other problems, FIG. 6 depicts a flowchart of an example method 600 for updating firmware of a field device using a wireless universal adapter. The method 600 begins by obtaining a cryptographically signed firmware image for updated firmware (block 602). Generally, field device firmware images may be signed with a private key unique to the provider of the field device firmware, such as a manufacturer, and verified by the wireless universal adapter using an embedded public key. The wireless universal adapter may verify that the signed firmware image was signed by the private cryptographic key corresponding to the published public cryptographic key owned by the provider. This allows process plants to verify approved firmware images. The wireless universal adapter may obtain the cryptographically signed firmware image via a wireless network interface controller. Block 602 may be performed by, for example, the wireless universal adapter 135, 205, 305.

In embodiments, the firmware image is cryptographically signed with a cryptographic private key unique to the provider of the firmware image. A cryptographic public key of the provider of the firmware image may also be obtained along with the firmware image, and the provider of the firmware image may then be verified using the cryptographic signature and the cryptographic public key from the provider. Further in some embodiments, multi-signatures may be used to verify that the firmware image was approved by multiple sources. For example, in these embodiments, the firmware image may be further cryptographically signed with a cryptographic private key unique to a process plant. A cryptographic public key of process plant may be obtained along with the firmware image, and the wireless universal adapter may verify the process plant approved the firmware update using the cryptographic signature and the cryptographic public key from the provider of the firmware image along with the cryptographic signature and the cryptographic public key for the process plant.

The method 600 may continue by verifying the provider of the firmware image based upon the cryptographic signature (block 604). The wireless universal adapter may use one or more validation methods/security procedures to verify the provider of the firmware image based upon the cryptographic signature. Advantageously, the wireless universal adapter may be connected to any number of field devices, which means that cryptographic libraries and support may be consolidated across these various field devices. Moreover, the cryptographic keys (e.g., a cryptographic public key of authorized providers and/or plants) may be updated on the wireless universal adapter while the process is running without risking disturbing the process. Block 604 may be performed by, for example, the wireless universal adapter 135, 205, 305.

For example, the wireless universal adapter may utilize, without limitation, a Schnorr multi-signature procedure to sign a firmware image at the factory and sign the firmware image at the plant. To illustrate, the wireless universal adapter may obtain a firmware image containing a cryptographic signature indicating an originator modifying the software or firmware such as John Doe (identified by a cryptographic proof-of-identity) and a cryptographic public key of the originator. The firmware image may also include identification information (operator workstation ID) for the device executing the software or firmware (identified by a cryptographic proof-of-identity), a description including a version number and time and date of the upgrade ("Update to version 10.3.1.4 on Jan. 15, 2019 at 6:02 a.m.").

The method 600 may continue by determining whether the field device is offline (block 606). Typically, a field device should be offline to receive firmware updates. If the wireless universal adapter determines that the field device is online (NO branch of block 606), then the method 600 may return to block 606 and periodically check the status of the field device to determine when the field device is offline and capable of receiving the firmware update. However, if the wireless universal adapter determines that the field device is offline (YES branch of block 606), then the method 600 may continue to block 608. Block 606 may be performed by, for example, the wireless universal adapter 135, 205, 305.

The method 600 continues by downloading the firmware image to the field device (block 608). The wireless universal adapter may download the firmware image to the field device via a transmitter, and in response to verifying the provider of the firmware image. In embodiments, the firmware image may be obtained while the field device is operating in a process plant, and the firmware image may be downloaded to the field device when the field device is offline. Block 608 may be performed by, for example, the wireless universal adapter 135, 205, 305.

In embodiments, the wireless universal adapter may encrypt the firmware image or the wireless universal adapter may obtain an encrypted firmware image from the provider. Then the field device may decrypt the encrypted firmware image upon receiving the encrypted firmware image. Moreover, in embodiments, the wireless universal adapter may utilize symmetric encryption techniques to encrypt the firmware image. Symmetric encryption may significantly reduce energy consumption compared with asymmetric techniques, and as such, may reduce processing requirements associated with firmware updates. Symmetric encryption may be used, for example, between the wireless network interface controller and the CPU of the field device to securely transfer firmware images between the wireless network interface controller and the field device, where the wireless universal adapter and the field device share a common key for performing the encryption and decryption. For example, the wireless universal adapter may utilize, without limitation, a pre-shared key (PSK) procedure, or an Elliptic-Curve Diffie-Hellman Ephemeral (ECDHE) procedure with a PSK (where the PSK is used to authenticate or sign the Diffie-Helman (DH) keys to ensure they are not tampered with during transmission), However, if the CPU of the field device does not support encryption techniques, decryption may occur, for example, in the wireless network interface controller of the wireless universal adapter (e.g., wireless network interface controller 316). Additionally, wireless network interface registration and activation techniques may be added to the main CPU firmware to prevent rogue radio modules from being added to field instruments.

While encryption techniques are discussed with reference to transferring firmware images, the encryption techniques may be performed for any transfer of data between the field device, the wireless universal adapter, and a remote device. In some examples, the wireless universal adapter may support multiple different login or authentication procedures that enable the establishment and/or exchange of a session secret key and the further authentication of the devices or the encryption/decryption of the transferred data using the session secret key. The login or authentication procedures may allow or restrict a user from certain tasks. The authentication and the establishment of a secret session key are accomplished during a single procedure of exchanged messages between the encryption techniques may be performed for any transfer of data between the field device, the wireless universal adapter and a remote device. The particular procedure implemented may depend on the circumstances under which the remote device seeks to connect with the wireless universal adapter.

In some examples, where both the wireless universal adapter and the remote device have access to the private (e.g., secret) authentication token, the procedures may rely on the authentication token to establish a security agreement and/or to authenticate the remote device. In some examples, authentication is based on a pre-shared key (PSK) authentication procedure. In other examples, authentication is based on an Elliptic-Curve Diffie-Hellman Ephemeral (ECDHE) procedure with a PSK (referred to herein as an ECDHE-PSK procedure for short). In the ECDHE-PSK procedure, the PSK is used to authenticate or sign the Diffie-Helman (DH) keys to ensure they are not tampered with during transmission. Moreover, such procedures may be used to validate the devices and/or users attempting to transfer data with the wireless universal adapter. The authentication token may be compared to a list of valid known devices/users to identify a match.

Both the PSK procedure and the ECDHE-PSK procedure are based on an authentication token that is available to both the wireless universal adapter and the remote device. In some situations, an authentication token may not be available (e.g., before a new remote device has been provisioned with the authentication token and/or before a crypto officer has initialized a newly installed and commissioned wireless universal adapter/field device). In some such situations, an Elliptic-Curve Diffie-Hellman Ephemeral (ECDHE) procedure with an Elliptic-Curve Digital Signature Algorithm (ECDSA) (referred to herein as an ECDHE-ECDSA procedure for short) may be implemented. The ECDHE-ECDSA procedure is similar to the ECDHE-PSK procedure except that the DH keys are signed or authenticated using the Digital Signal Algorithm (DSA) rather than the PSK. Furthermore, to increase security and overcome the inability to authenticate a user based on a secret token, examples that implement the ECDHE-ECDSA procedure (or any one of the other procedures) may also require a test for user presence to confirm the physical presence of the user to mitigate against unauthorized (e.g., malicious) logins from a remotely located devices such as for example a handheld device being used as a remote device.

Thus, utilizing the method 600, the wireless universal adapter may store and download the firmware images while the process is running. The wireless universal adapter may then verify and transfer the firmware updates to the field device when the device is out-of-service and the current supply is at an appropriate level. Accordingly, the method 600 may save technician time by eliminating the need for technicians to physically wait for firmware updates to complete for a field device. Utilizing wireless communication such as BLE additionally alleviates the need to access the field wiring or terminal box which alleviates the concerns for potentially shorting out the instrument. Moreover, the method 600 maintains firmware updated robustness by incorporating additional levels of security associated with the cryptographic techniques described herein.

Additionally, the previous aspects of the disclosure are exemplary only and not intended to limit the scope of the disclosure.

The following additional considerations apply to the foregoing discussion. Throughout this specification, actions described as performed by any device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device). The instructions, when executed by one or more processors of a corresponding device (e.g., an operator workstation, a diagnostic tool, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Further, while the terms "operator," "personnel," "person," "user," "technician," "administrator," and like other terms are used to describe persons in the process plant environment that may use or interact with the systems, apparatus, and methods described herein, these terms are not intended to be limiting. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "causing to be presented," "causing to be displayed," "displaying," or the like may refer to actions or processes of a machine (e.g., a computer) that manipulates or transforms data represented as physical (e.g., electronic, magnetic, biological, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed is:

1. A field communicator device comprising:
one or more processors;
a transmitter,
a wireless network interface controller; and
a memory storing instructions that, when executed by the one or more processors, cause the field communicator device to:
retrieve, at a plurality of time intervals from a field device communicatively coupled to the field communicator device via the transmitter, process parameter data encoded in a field device transmission protocol, the process parameter data corresponding to a process parameter for the field device;
store, in the memory, at least some of the process parameter data;
analyze the process parameter data over the plurality of time intervals to identify a condition of the field device; and
transmit, via the wireless network interface controller, an indication of the condition of the field device to a remote device.

2. The field communicator device of claim 1, wherein to analyze the process parameter data, the instructions cause the field communicator device to:
for each of one or more process parameters, combine the respective process parameter values of the one or more process parameters over the plurality of instances of time to generate a process parameter metric; and
detect the condition of the field device based on the process parameter metric.

3. The field communicator device of claim 2, wherein to combine the respective process parameter values of the one or more process parameters over the plurality of instances of time to generate the process parameter metric, the instructions cause the field communicator device to calculate at least one of: a moving average of the respective process parameter values or a decaying average of the respective process parameter values over the plurality of instances of time to generate the process parametric metric.

4. The field communicator device of claim 3, wherein the instructions further cause the field communicator device to:
generate a statistical model based on historical process parameter values of the one or more process parameters; and
apply the process parameter metric to the statistical model to identify the condition of the field device.

5. The field communicator device of claim 4, wherein to generate the statistical model, the instructions cause the field communicator device to:
classify each historical process parameter value as corresponding to a first set of process parameter values for one or more process plant entities that have experienced the condition or as corresponding to a second set of process parameter values for one or more process plant entities that have not experienced the condition; and
generate the statistical model based on the classifications of the historical process parameter values.

6. The field communicator device of claim 5, wherein the instructions cause the field communicator device to:
receive an indication of whether or not the field device has experienced the condition; and
update the historical process parameter values to include the respective process parameter values of the one or more process parameters of the field device and based on the indication of whether or not the field device has experienced the condition.

7. The field communicator device of claim 1, wherein the instructions further cause the field communicator device to:
receive, via the wireless network interface controller, process parameter data corresponding to a process parameter for another field device; and
analyze the process parameter data for the field device and the process parameter data for the other field device over the plurality of time intervals to identify the condition of the field device.

8. The field communicator device of claim 1, wherein the process parameter data is retrieved, via the transmitter, over a plurality of communication channels.

9. The field communicator device of claim 1, wherein the condition includes a performance monitoring metric of the field device including at least one of:
an alert,
a health indicator, or
an estimated lifespan.

10. The field communicator device of claim 1, wherein the condition includes at least one of: dead band, dead time, a response time, a set point overshoot, component degradation, a change in a friction factor, a change in a cycle rate, or a change in a stroke time.

11. The field communicator device of claim 1, wherein the instructions further cause the field communicator device to:
prior to transmitting the indication of the condition of the field device to the remote device, receive, from the remote device, an authentication token;
validate the remote device by comparing the authentication token to a list of valid devices; and
authenticate the remote device by comparing the authentication token to a known authentication token.

12. The field communicator device of claim 11, wherein authenticating the remote device further comprises one or more of (i) a pre-shared key (PSK) procedure or (ii) an Elliptic-Curve Diffie-Hellman Ephemeral (ECDHE) procedure with a PSK.

13. A method for identifying a condition of a field device in a process plant, the method comprising:
retrieving, by one or more processors in a field communicator device at a plurality of time intervals from a field device communicatively coupled to the field communicator device via a transmitter, process parameter data encoded in a field device transmission protocol, the process parameter data corresponding to a process parameter for the field device, the field communicator device including a transmitter for communicating with the field device via a first communication link and a wireless network interface controller for communicating with remote devices via a second communication link;
storing, by the one or more processors in the memory, at least some of the process parameter data;
analyzing, by the one or more processors, the process parameter data over the plurality of time intervals to identify a condition of the field device; and
transmitting, by the one or more processors via the wireless network interface controller, an indication of the condition of the field device to a remote device.

14. The method of claim 13, wherein analyzing the process parameter data includes:
for each of one or more process parameters, combining the respective process parameter values of the one or more process parameters over the plurality of instances of time to generate a process parameter metric; and
detecting the condition of the field device based on the process parameter metric.

15. The method of claim 14, wherein combining the respective process parameter values of the one or more process parameters over the plurality of instances of time to generate the process parameter metric includes calculating at least one of: a moving average of the respective process parameter values or a decaying average of the respective process parameter values over the plurality of instances of time to generate the process parametric metric.

16. The method of claim 15, further comprising:
generating a statistical model based on historical process parameter values of the one or more process parameters; and
applying the process parameter metric to the statistical model to identify the condition of the field device.

17. The method of claim 13, further comprising:
receiving, via the wireless network interface controller, process parameter data corresponding to a process parameter for another field device; and
analyzing the process parameter data for the field device and the process parameter data for the other field device over the plurality of time intervals to identify the condition of the field device.

18. The method of claim 13, wherein the condition includes a performance monitoring metric of the field device including at least one of:
an alert,
a health indicator, or
an estimated lifespan.

19. The method of claim 13, wherein the condition includes at least one of: dead band, dead time, a response time, a set point overshoot, component degradation, a change in a friction factor, a change in a cycle rate, or a change in a stroke time.

20. The method of claim 13, further comprising:
prior to transmitting the indication of the condition of the field device to the remote device, receiving, from the remote device, an authentication token;
validating the remote device by comparing the authentication token to a list of valid devices; and
authenticating the remote device by comparing the authentication token to a known authentication token.

21. The method of claim 20, wherein authenticating the remote device further comprises one or more of (i) a pre-shared key (PSK) procedure or (ii) an Elliptic-Curve Diffie-Hellman Ephemeral (ECDHE) procedure with a PSK.

22. A field communicator device comprising:
one or more processors;
a transmitter,
a wireless network interface controller; and
a memory storing instructions that, when executed by the one or more processors, cause the field communicator device to:
detecting a triggering event;
in response to detecting the trigging event:
retrieve, from a field device communicatively coupled to the field communicator device via the transmitter, process parameter data associated with the field device;
store the process parameter data in the memory along with an indication of a time in which the process parameter data was retrieved; and
transmit, via the wireless network interface controller, the process parameter data to a remote device; and
remove the process parameter data from the memory after a threshold duration or in response to receiving an indication from the remote device that the process parameter data was received.

23. The field communicator device of claim 22, wherein the process parameter data is stored and transmitted in a format indicated by a field device transmission protocol.

24. The field communicator device of claim 22, wherein the triggering event is an alert, and in response to receiving an indication of the alert, the instructions cause the field communicator device to:
retrieve, from the field device via the transmitter, alert information for the alert encoded in a field device transmission protocol.

25. The field communicator device of claim 22, wherein the process parameter data is retrieved, via the transmitter, over a plurality of communication channels.

26. The field communicator device of claim 22, wherein the remote device is a user device or a server device.

27. The field communicator device of claim 22, wherein to transmit, the process parameter data, the instructions cause the field communicator device to broadcast, via the wireless network interface controller, the process parameter data to remote devices within a communication range of the field communicator device.

28. The field communicator device of claim 22, wherein to transmit, the process parameter data, the instructions cause the field communicator device to:
receive a request to connect to the field communicator device via a short-range communication link from the remote device;
connect, via the short-range communication link, to the remote device; and
transmit, via the short-range communication link, the process parameter data to the remote device.

29. The field communicator device of claim 22, wherein the process parameter data is transmitted to the remote device in a common format independent of a field device transmission protocol in which the field communicator device retrieves the process parameter data.

30. A field communicator device comprising:
one or more processors;
a transmitter,
a wireless network interface controller; and
a memory storing instructions that, when executed by the one or more processors, cause the field communicator device to:
obtain, via the wireless network interface controller, a firmware image for updated firmware for a field device communicatively coupled to the field communicator device;
verify a provider of the firmware image; and
in response to verifying the provider of the firmware image, download, via the transmitter, the firmware image to the field device.

31. The field communicator device of claim 30, wherein the firmware image is cryptographically signed with a cryptographic private key of the provider of the firmware image, a cryptographic public key of the provider of the firmware image is obtained along with the firmware image, and the provider of the firmware image is verified using the cryptographic signature and the cryptographic public key from the provider.

32. The field communicator device of claim 31, wherein the firmware image is further cryptographically signed with a cryptographic private key of a process plant, a cryptographic public key of process plant is obtained along with the firmware image, and the instructions further cause the field communicator device to verify the process plant approved the firmware update using the cryptographic signature and the cryptographic public key from the process plant.

33. The field communicator device of claim 30, wherein the firmware image is obtained while the field device is operating in a process plant, and the firmware image is downloaded to the field device when the field device is offline.

34. The field communicator device of claim 30, wherein the instructions further cause the field communicator device to encrypt the firmware image, and the field device decrypts the encrypted firmware image.

35. The field communicator device of claim 30, wherein the instructions further cause the field communicator device to encrypt the firmware image using symmetric encryption techniques.

36. A method for updating a firmware image in a field device in a process plant, the method comprising:
obtaining, by one or more processors in a field communicator device via a wireless network interface controller, a firmware image for updated firmware for a field device communicatively coupled to the field communicator device, the field communicator device including a transmitter for communicating with the field device via a first communication link and the wireless network interface controller for communicating with remote devices via a second communication link;
verifying, by the one or more processors, a provider of the firmware image; and
in response to verifying the provider of the firmware image, downloading, by the one or more processors via the transmitter, the firmware image to the field device.

37. The method of claim 36, wherein the firmware image is cryptographically signed with a cryptographic private key of the provider of the firmware image, a cryptographic public key of the provider of the firmware image is obtained along with the firmware image, and the provider of the firmware image is verified using the cryptographic signature and the cryptographic public key from the provider.

38. The method of claim 37, wherein the firmware image is further cryptographically signed with a cryptographic private key of a process plant, a cryptographic public key of process plant is obtained along with the firmware image, and the instructions further cause the field communicator device to verify the process plant approved the firmware update using the cryptographic signature and the cryptographic public key from the process plant.

39. The method of claim 36, wherein the firmware image is obtained while the field device is operating in a process plant, and the firmware image is downloaded to the field device when the field device is offline.

40. The method of claim 36, further comprising:
encrypting the firmware image, wherein the field device decrypts the encrypted firmware image.

41. The method of claim 36, wherein the firmware image is encrypted using symmetric encryption techniques.

* * * * *

UNITED STATES PATENT AND TRADEMARK OFFICE
CERTIFICATE OF CORRECTION

Page 1 of 1

PATENT NO. : 12,074,653 B2
APPLICATION NO. : 17/809894
DATED : August 27, 2024
INVENTOR(S) : John S. Fuller et al.

It is certified that error appears in the above-identified patent and that said Letters Patent is hereby corrected as shown below:

In the Drawings

At Fig. 2, Sheet 2 of 6, Tag "202" should be Tag -- 205 --.

In the Specification

At Column 8, Line 35, "operate" should be -- operated. --.

At Column 18, Lines 21-22, "field device 135" should be -- wireless universal adapter 135 --.

At Column 23, Line 42, "protocols 324" should be -- protocol modules 324 --.

At Column 31, Line 22, "techs" should be -- tech's --.

At Column 31, Line 56, "highway" should be -- highway. --.

At Column 34, Line 2, "transmission)," should be -- transmission). --.

In the Claims

At Column 40, Line 47, "transmitter," should be -- transmitter; --.

Signed and Sealed this
Thirtieth Day of December, 2025

John A. Squires
*Director of the United States Patent and Trademark Office*